United States Patent
Shimotani et al.

(10) Patent No.: US 9,179,140 B2
(45) Date of Patent: Nov. 3, 2015

(54) 3DIMENSION STEREOSCOPIC DISPLAY DEVICE

(75) Inventors: Mitsuo Shimotani, Tokyo (JP); Makoto Mikuriya, Tokyo (JP); Takeo Sakairi, Tokyo (JP); Eriko Toma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 382 days.

(21) Appl. No.: 13/702,332

(22) PCT Filed: Oct. 19, 2010

(86) PCT No.: PCT/JP2010/006186
§ 371 (c)(1),
(2), (4) Date: Dec. 6, 2012

(87) PCT Pub. No.: WO2012/053029
PCT Pub. Date: Apr. 26, 2012

(65) Prior Publication Data
US 2013/0076876 A1     Mar. 28, 2013

(51) Int. Cl.
| H04N 13/00 | (2006.01) |
| H04N 15/00 | (2006.01) |
| H04N 13/02 | (2006.01) |
| H04N 13/04 | (2006.01) |
| G01C 21/36 | (2006.01) |
| G06F 3/01  | (2006.01) |
| H04N 9/80  | (2006.01) |
| H04N 5/92  | (2006.01) |
| H04N 5/89  | (2006.01) |
| H04N 5/84  | (2006.01) |

(52) U.S. Cl.
CPC .......... *H04N 13/0486* (2013.01); *G01C 21/365* (2013.01); *G06F 3/013* (2013.01); *H04N 13/0454* (2013.01); *H04N 13/0497* (2013.01)

(58) Field of Classification Search
USPC .......... 348/42, 44, 51, 52; 386/239, 240, 242, 386/326, 335
See application file for complete search history.

(56) References Cited

U.S. PATENT DOCUMENTS 5,826,212 A   10/1998   Nagai
5,883,739 A    3/1999   Ashihara et al.
(Continued)

FOREIGN PATENT DOCUMENTS

JP    62-57392 A    3/1987
JP    4-255891 A    9/1992
(Continued)

*Primary Examiner* — Daquan Zhao
(74) *Attorney, Agent, or Firm* — Birch, Stewart, Kolasch & Birch, LLP

(57) ABSTRACT

Disclosed is a 3Dimension stereoscopic display device including a screen composition processing unit for generating a right-eye image or video image and a left-eye image or video image for planar display or for three-dimensional stereoscopic display of an image or video image, a video image playback device 5 for playing back the images or video images, and a stereoscopic display monitor unit 6 for displaying the images or video images played back by the playback device 5 in a three-dimensional stereoscopic manner, in which the screen composition processing unit 4 switches between outputting the right-eye image or video image and the left-eye image or video image for planar display to the playback device 5 and outputting the right-eye image or video image and the left-eye image or video image for three-dimensional stereoscopic display to the playback device 5 according to state of a moving object.

20 Claims, 15 Drawing Sheets

(56) References Cited

U.S. PATENT DOCUMENTS

| | | | |
|---|---|---|---|
| 8,624,797 B2* | 1/2014 | Lee et al. ................. 345/4 |
| 2008/0161997 A1 | 7/2008 | Wengelnik et al. |
| 2009/0132161 A1 | 5/2009 | Akita et al. |
| 2010/0153111 A1 | 6/2010 | Hirai et al. |

FOREIGN PATENT DOCUMENTS

| | | |
|---|---|---|
| JP | 5-147456 A | 6/1993 |
| JP | 7-105484 A | 4/1995 |
| JP | 8-124096 A | 5/1996 |
| JP | 11-44545 A | 2/1999 |
| JP | 11-119147 A | 4/1999 |
| JP | 2003-280812 A | 10/2003 |
| JP | 2004-280496 A | 10/2004 |
| JP | 2005-175566 A | 6/2005 |
| JP | 2008-230560 A | 10/2008 |
| JP | 2008-538037 A | 10/2008 |
| WO | WO 2004/099718 | 11/2004 |
| WO | WO 2007/069573 A1 | 6/2007 |
| WO | WO 2007/129382 A1 | 11/2007 |

* cited by examiner

3DIMENSION STEREOSCOPIC DISPLAY DEVICE

FIELD OF THE INVENTION

The present invention relates to a 3Dimension stereoscopic display device which displays a 3Dimension stereoscopic image or a 3Dimension stereoscopic movie.

BACKGROUND OF THE INVENTION

A conventional stereoscopic display device disclosed by patent reference 1 provides a 3Dimension stereoscopic image mainly intended for home use. Because this stereoscopic display device enables the user to watch a 3Dimension stereoscopic movie without wearing stereoscopic vision glasses, the stereoscopic display device offers high convenience to the user. For example, the stereoscopic display device is suitable for use as a content playback device for the front seat and an RSE (Rear Seat Entertainment) display for rear seats.

RELATED ART DOCUMENT

Patent Reference

Patent reference 1: Japanese Unexamined Patent Application Publication No. 2005-175566

SUMMARY OF THE INVENTION

However, when applying such a conventional technology as represented by patent reference 1 to a display device for displaying in-vehicle information for the driver or a meter panel, the conventional technology cannot be used just as it is unless a safety measure is taken. For example, because a 3Dimension stereoscopic movie having movements or a 3Dimension stereoscopic image or 3Dimension stereoscopic movie bristling with stereoscopically displayed ground objects located disorderly such as buildings which is provided for the driver while driving the vehicle impairs the visibility of the screen instead, a safety measure must be taken.

The present invention is made in order to solve the above-mentioned problem, and it is therefore an object of the present invention to provide a user-friendly 3Dimension stereoscopic display device which can secure the safety of the driver and can provide legible information for the driver.

In accordance with the present invention, there is provided a 3Dimension stereoscopic display device mounted in or held by a moving object, the 3Dimension stereoscopic display device including: a moving object state detection unit for detecting a state of the moving object; a screen composition processing unit for generating a right-eye image or video image and a left-eye image or video image for planar display or for three-dimensional stereoscopic display of an image or video image which is a display object; a playback processing unit for playing back the images or video images generated by the screen composition processing unit; and a stereoscopic display monitor unit for receiving the images or video images played back by the playback processing unit which are the display object, and displaying the images or video images in a three-dimensional stereoscopic manner, in which the screen composition processing unit switches between outputting the right-eye image or video image and the left-eye image or video image for planar display to the playback processing unit and outputting the right-eye image or video image and the left-eye image or video image for three-dimensional stereoscopic display to the playback processing unit according to the state of the moving object which is detected by the moving object state detection unit.

According to the present invention, there is provided an advantage of being able to provide a user-friendly 3Dimension stereoscopic display device which secures the safety of the driver and provides legible information for the driver.

EMBODIMENTS OF THE INVENTION

Hereafter, in order to explain this invention in greater detail, the preferred embodiments of the present invention will be described with reference to the accompanying drawings.

Embodiment 1

Figure 1:
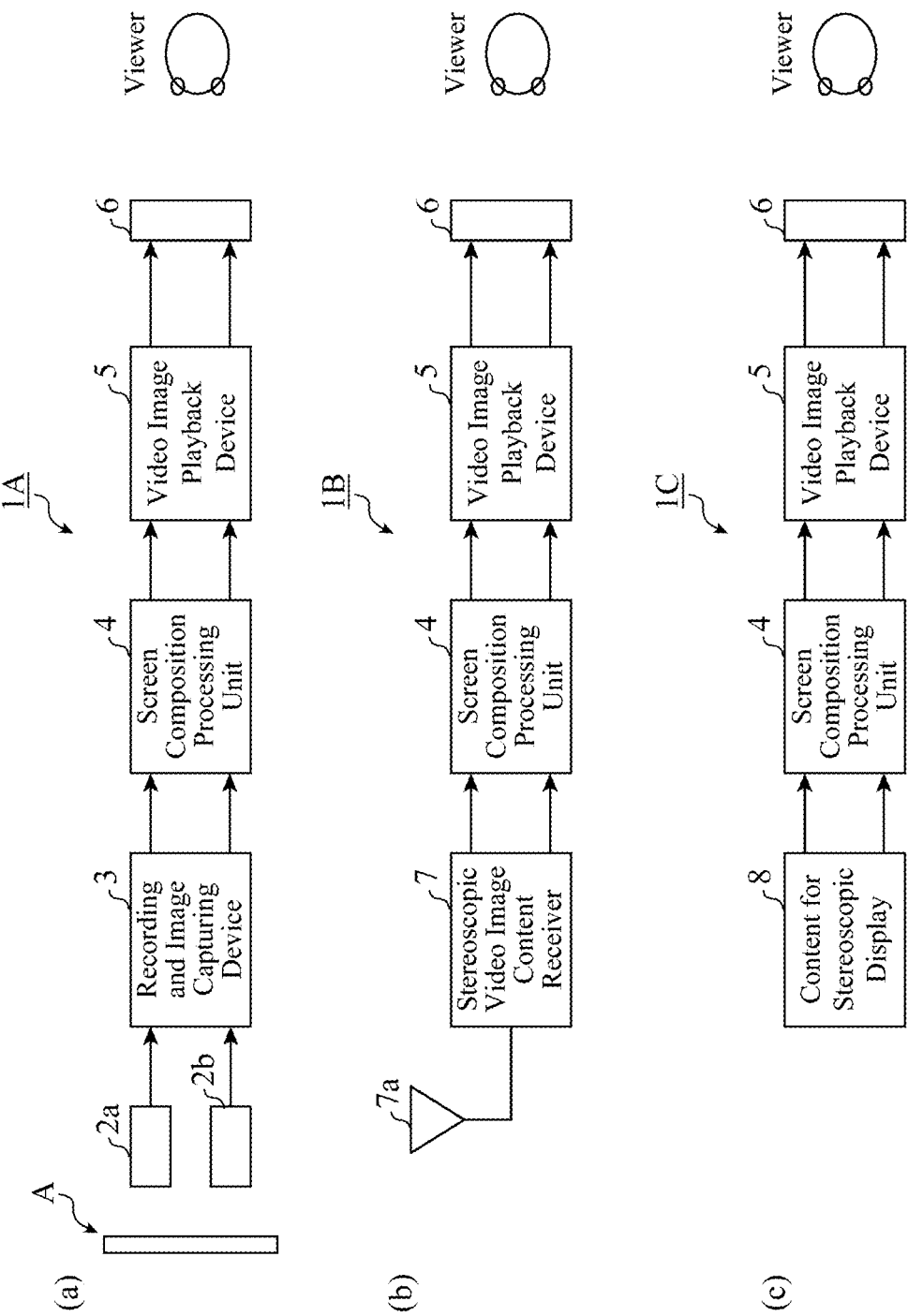
FIG. 1 is a block diagram showing an example of the structure of a stereoscopic display system using a 3Dimension stereoscopic display device in accordance with the present invention.

FIG. 1 is a block diagram showing an example of the structure of a stereoscopic display system which uses a 3Dimension stereoscopic display device in accordance with the present invention. FIG. 1(a) shows the stereoscopic display system 1A which displays a 3D video image on the basis of right and left video images captured using cameras for both eyes. Referring to FIG. 1(a), the stereoscopic display system 1A is provided with a left-eye camera 2a, a right-eye camera 2b, a recording and image capturing device 3, a screen composition processing unit 4, a video image playback device (playback processing unit) 5, and a stereoscopic display monitor (stereoscopic display monitor unit) 6. The left-eye camera 2a and the right-eye camera 2b are arranged at an interval which takes into consideration the parallax difference between the two eyes, and capture a scene A which is an object to be captured under control of the recording and image capturing device 3. Right and left video data about the scene A captured by the left-eye camera 2a and the right-eye camera 2b are recorded in the recording and image capturing device 3. The screen composition processing unit 4 carries out a 3Dimension stereoscopic movie compositing process on the right and left video data read from the recording and image capturing device 3, the 3Dimension stereoscopic movie composite process being specific to the present invention, and outputs the right and left video data processed thereby to the video image playback device 5. The video image playback device 5 plays back the right and left video data processed by the screen composition processing unit 4, and then outputs the right and left video data played back thereby to the stereoscopic display monitor 6. The stereoscopic display monitor 6 displays the right and left video data played back by the video image playback device 5 in a stereoscopic manner when viewed from a viewer.

A stereoscopic display system 1B shown in FIG. 1(b) is provided with a stereoscopic video image content receiver 7 which communicates with an external device via an antenna 7a, an image composition processing unit 4, a video image playback device 5, and a stereoscopic display monitor 6. The stereoscopic video image content receiver 7 receives a stereoscopic video image content including right and left video data as mentioned above from the external device via the antenna 7a. The screen composition processing unit 4 carries out a 3Dimension stereoscopic movie compositing process on the right and left video data included in the stereoscopic video image content received by the stereoscopic video image content receiver 7, the 3Dimension stereoscopic movie compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a).

A stereoscopic display system 1C shown in FIG. 1(c) is provided with a storage unit 8 for storing a content for stereoscopic display, an image composition processing unit 4, a video image playback device 5, and a stereoscopic display monitor 6. The content for stereoscopic display is content data including right and left video data as mentioned above. As the storage unit 8, an HDD (Hard Disk Drive) or a semiconductor memory for storing the content for stereoscopic display can be provided. As an alternative, a drive device for playing back a memory medium, such as a CD or a DVD, for storing the content for stereoscopic display can be provided.

The screen composition processing unit 4 carries out a 3Dimension stereoscopic movie compositing process on the right and left video data in the content for stereoscopic display read from the storage unit 8, the 3Dimension stereoscopic movie compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a). So-called three-dimensional data (e.g. three-dimensional map data) can be stored as the content for stereoscopic display, and the screen composition processing unit 4 can compute how the image shown by this three-dimensional data appears from each of the left and right points of view to generate right and left video data.

Figure 2:
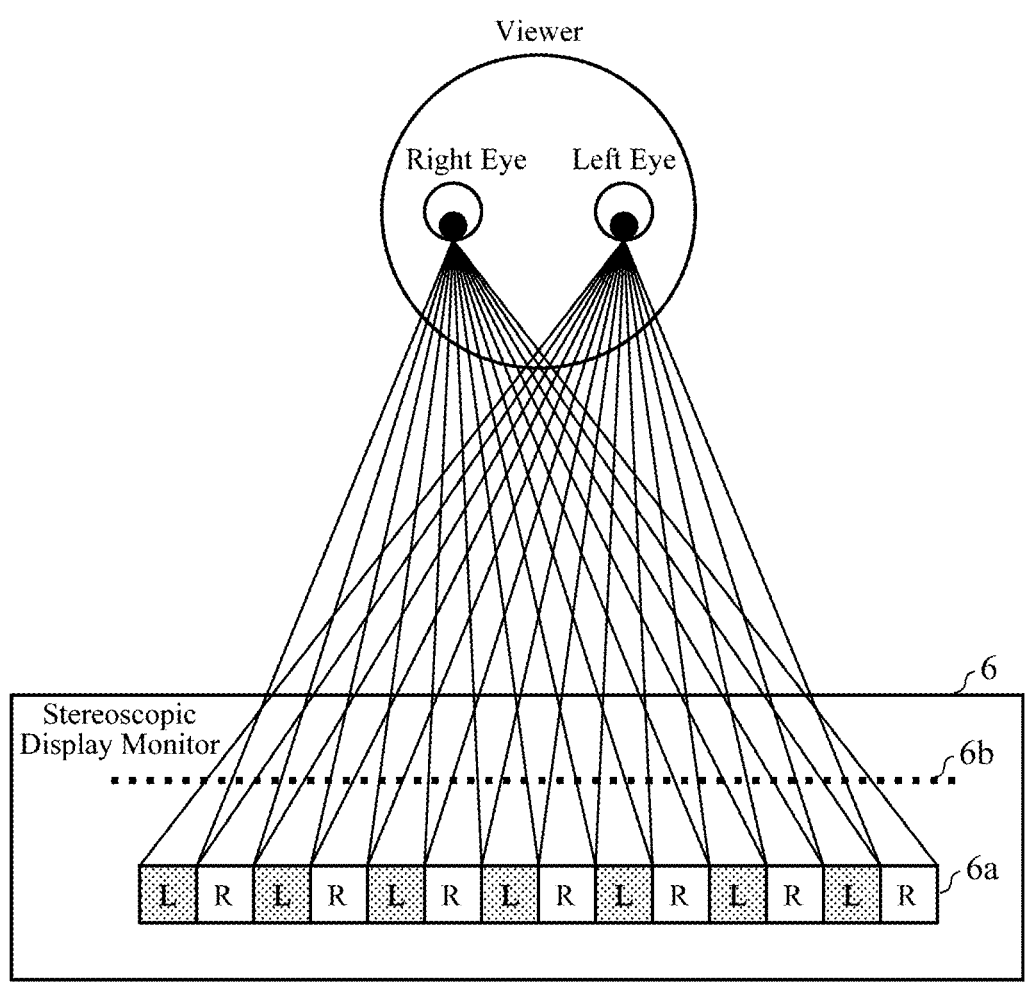
FIG. 2 is a view for explaining the principle behind a stereoscopic display in a stereoscopic display monitor.

FIG. 2 is a view for explaining the principle behind a stereoscopic display produced by the stereoscopic display monitor, and shows an example of a stereoscopic display intended for the naked eye. The stereoscopic display monitor 6 shown in FIG. 2 is provided with a liquid crystal display element group 6a and a parallax barrier unit 6b. The liquid crystal display element group 6a has a liquid crystal element group for right eyes which provides directivity for causing a right-eye video image to reach a right eye, and a liquid crystal element group for left eyes which provides directivity for causing a left-eye video image to reach a left eye. The parallax barrier unit 6b is a visual field barrier for blocking light from a backlight (not shown in FIG. 2) in order to alternately display the right-eye video image and the left-eye video image.

A video signal for left eyes (L) and a video signal for right eyes (R) which the video image playback device 5 generates by playing back the right and left video data are alternately inputted to the stereoscopic display monitor 6 in order of L, R, L, R, and . . . . When receiving the video signal for left eyes (L), the liquid crystal display element group 6a operates the liquid crystal element group for left eyes, whereas when receiving the video signal for right eyes (R), the liquid crystal display element group 6a operates the liquid crystal element group for right eyes. The parallax barrier unit 6b blocks the light emitted from the backlight and passing through the liquid crystal display element group for right eyes at the time that the liquid crystal element group for left eyes operates, whereas the parallax barrier unit 6b blocks the light emitted from the backlight and passing through the liquid crystal display element group for left eyes at the time that the liquid crystal element group for right eyes operates. As a result, the right-eye video image and the right-eye video image are displayed alternately on the screen of the stereoscopic display monitor 6, so that a viewer can watch the stereoscopic video image at his or her point of view shown in FIG. 2.

The present invention is not limited to the stereoscopic display monitor 6 having the structure shown in FIG. 2, and a monitor which implements stereoscopic vision by using another mechanism can be alternatively used. For example, a method of providing a stereoscopic image by causing a viewer to wear glasses having left and right lenses to which different polarizing plates are attached as exclusive glasses can be used.

Figure 3:
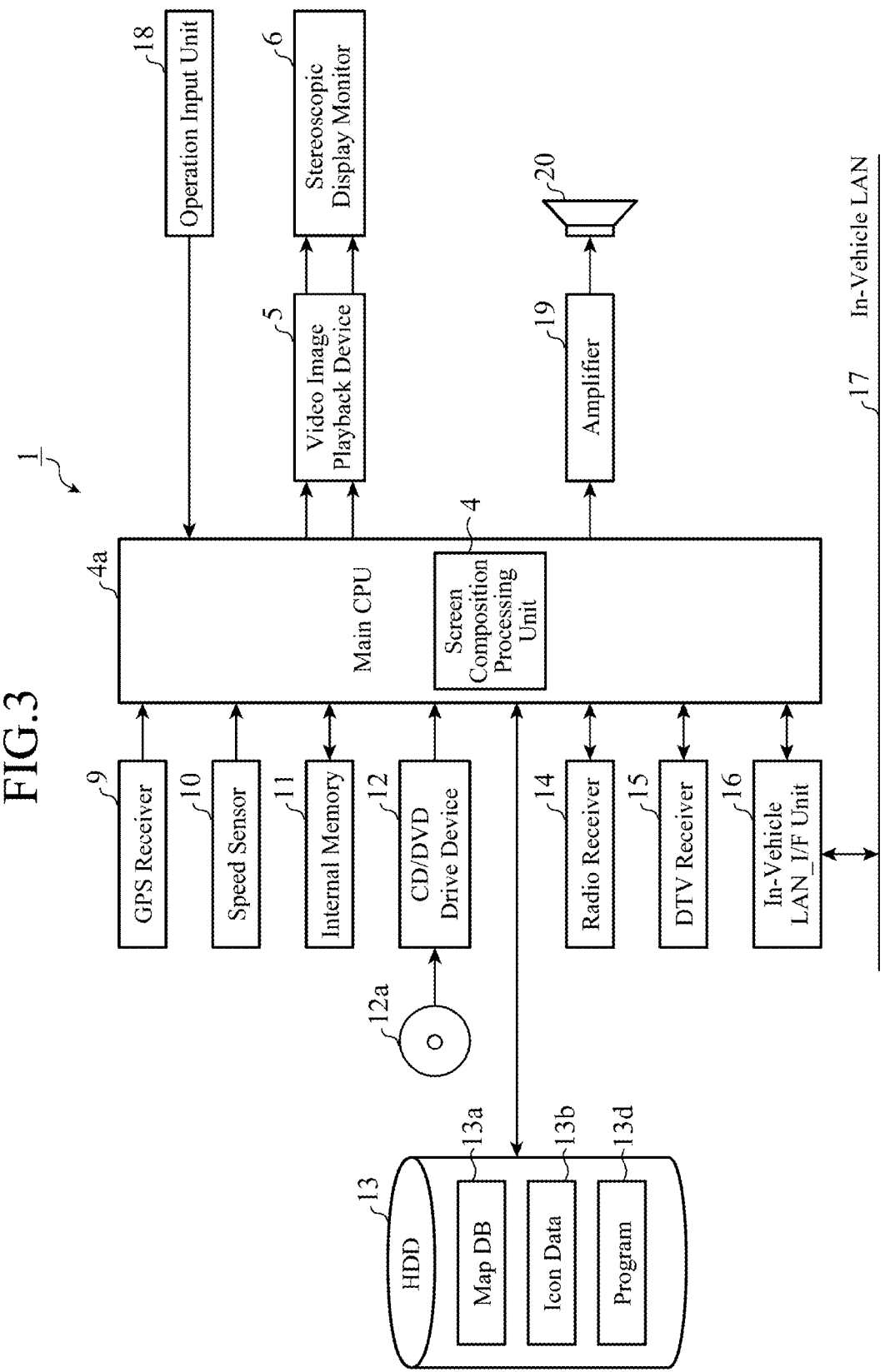
FIG. 3 is a block diagram showing the structure of an in-vehicle information system which uses the 3Dimension stereoscopic display device in accordance with Embodiment 1 of the present invention.

FIG. 3 is a block diagram showing the structure of an in-vehicle information system which uses the 3Dimension stereoscopic display device in accordance with Embodiment 1 of the present invention. In the example shown in FIG. 3, the in-vehicle information system 1 functions as a stereoscopic display system shown in FIG. 1, regarding a display of an image, such as a map or a video image. Further, the in-vehicle information system 1 is provided with a main CPU 4a, a video image playback device 5, a stereoscopic display monitor 6, a GPS (Global Positioning System) receiver 9, a speed sensor (moving object state detection unit) 10, an internal memory 11, a CD/DVD drive device 12, an HDD 13, a radio receiver 14, a DTV receiver 15, an in-vehicle LAN_I/F unit 16, an operation input unit 18, an amplifier 19, and a speaker 20.

The main CPU 4a controls each component disposed in the in-vehicle information system 1. This main CPU 4a functions as the screen composition processing unit 4 shown in FIG. 1 by executing a program 13d (application program for in-vehicle information processing) stored in the HDD 13. The video image playback device 5 plays back the right and left video data on which the screen composition processing unit 4 of the main CPU 4a has carried out a compositing process, and outputs the right and left video data played back thereby to the stereoscopic display monitor 6. Further, the stereoscopic display monitor 6 displays the right and left video data played back by the video image playback device 5 in a stereoscopic manner when viewed from a viewer.

The GPS receiver 9 receives the position information about the position of the vehicle from GPS satellites, and the speed sensor 10 detects vehicle speed pulses for calculating the vehicle speed of the vehicle. The internal memory 11 serves as a work area when the main CPU 4a executes the application program for in-vehicle information processing. The CD/DVD drive device 12 plays back an AV source stored in a memory medium 12a, such as a CD or DVD. When stereoscopic display video data are included in an AV source stored in the memory medium 12a, the CD/DVD drive device functions as the stereoscopic video image content receiver 7 shown in FIG. 1(b), and the in-vehicle information system 1 functions as the stereoscopic display system 1B shown in FIG. 1(b).

The HDD (hard disk drive) 13 is a mass storage device mounted in the in-vehicle information system 1, and stores a map database (abbreviated as a map DB hereafter) 13a, icon data 13b, and a program 13d. The map DB 13a is a database in which map data for use in navigation processing are registered. POI information in which the locations of POIs (Points Of Interest) on a map or detailed information associated with these POIs are described is also included in the map data. The icon data 13b show icons which are to be displayed on the screen of the stereoscopic display monitor 6. For example, stereoscopic image icons each showing a stereoscopic image of a ground object, such as a landmark, or a building are provided as icon data. Further, stereoscopic image icons include an icon showing a vehicle position mark, an icon showing a destination mark, an icon showing a waypoint mark, and an icon showing a route mark which are used in navigation processing. The program 13d is an application program for in-vehicle information processing which the main CPU 4a executes. For example, the program has an application program for map display including a program module for implementing the functions of the screen compositing process unit 4.

The radio receiver 14 receives a radio broadcast, and makes a channel selection according to, for example, an operation on a not-shown button selector. The DTV receiver 15 receives a digital television broadcast, and makes a channel selection according to an operation on a not-shown button selector, like the radio receiver 14. The DTV receiver 15 also functions as the stereoscopic video image content receiver 7 shown in FIG. 1(b) when 3Dimension stereoscopic display video data are included in a digital television broadcast received thereby, and the in-vehicle information system 1 functions as the stereoscopic display system 1B shown in FIG. 1(b).

The in-vehicle LAN_I/F unit 16 is an interface between an in-vehicle LAN (Local Area Network) 17 and the main CPU 4a, and relays data communications between, for example, other equipment connected to the in-vehicle LAN 17, and the main CPU 4a. Further, the storage unit 8 shown in FIG. 1(c) is connected to the in-vehicle LAN 17, and, when the in-vehicle LAN_I/F unit 16 is regarded as a component for relaying between this storage unit 8 and the screen compositing process unit 4 of the main CPU 4a, the in-vehicle information system 1 functions as the stereoscopic display system 1C shown in FIG. 1(c).

The operation input unit 18 is a component for enabling the user to perform an operational input. As this operation input unit 18, a key switch (operation switch) disposed in the vicinity of the screen of the stereoscopic display monitor 6 and a remote control can be provided, for example. In a case in which a touch panel is disposed on the screen of the stereoscopic display monitor 6, the touch switch can be provided as the operation input unit 18.

Sound signals played back by the CD/DVD drive device 12, the radio receiver 14, and the DTV receiver 15 and a sound signal from the main CPU 4a are amplified by the amplifier 19, and a sound is outputted via the speaker 20. As the sound signal from the main CPU 4a, there is a route guidance voice signal generated through the navigation processing, for example.

Next, the operation of the 3Dimension stereoscopic display device will be explained. When displaying a stereoscopic image on a planar image, the 3Dimension stereoscopic display device in accordance with Embodiment 1 produces a three-dimensional stereoscopic display in which the stereoscopic image looks as if it is floating on the planar image by using stereoscopic vision or displays a three-dimensional image for planar display according to the state of a moving object equipped with the 3Dimension stereoscopic display device. For example, in a case in which the in-vehicle information system is applied to a map display of an in-vehicle navigation device, the 3Dimension stereoscopic display device produces a three-dimensional stereoscopic display in which a stereoscopic image of a building or the like looks as if it is floating on a planar map when the vehicle is at rest (when the parking brake of the vehicle is put on), whereas the 3Dimension stereoscopic display device displays a three-dimensional image of a building or the like on a planar map when the vehicle enters a travelling state (when the vehicle is travelling or when the vehicle is at rest, but the parking brake is not put on).

In accordance with the present invention, as contents which are targets to be displayed in a three-dimensional stereoscopic manner, a screen for display of map information expressed in a stereoscopic manner (three-dimensional contour lines, Terrain Model (geographical feature)) and in-vehicle information, and a screen or balloon for display of an icon image, surrounding environment information, vehicle information, control information about equipment in the vehicle, display information about vehicle equipment, driver information, etc. are provided.

Figure 4:
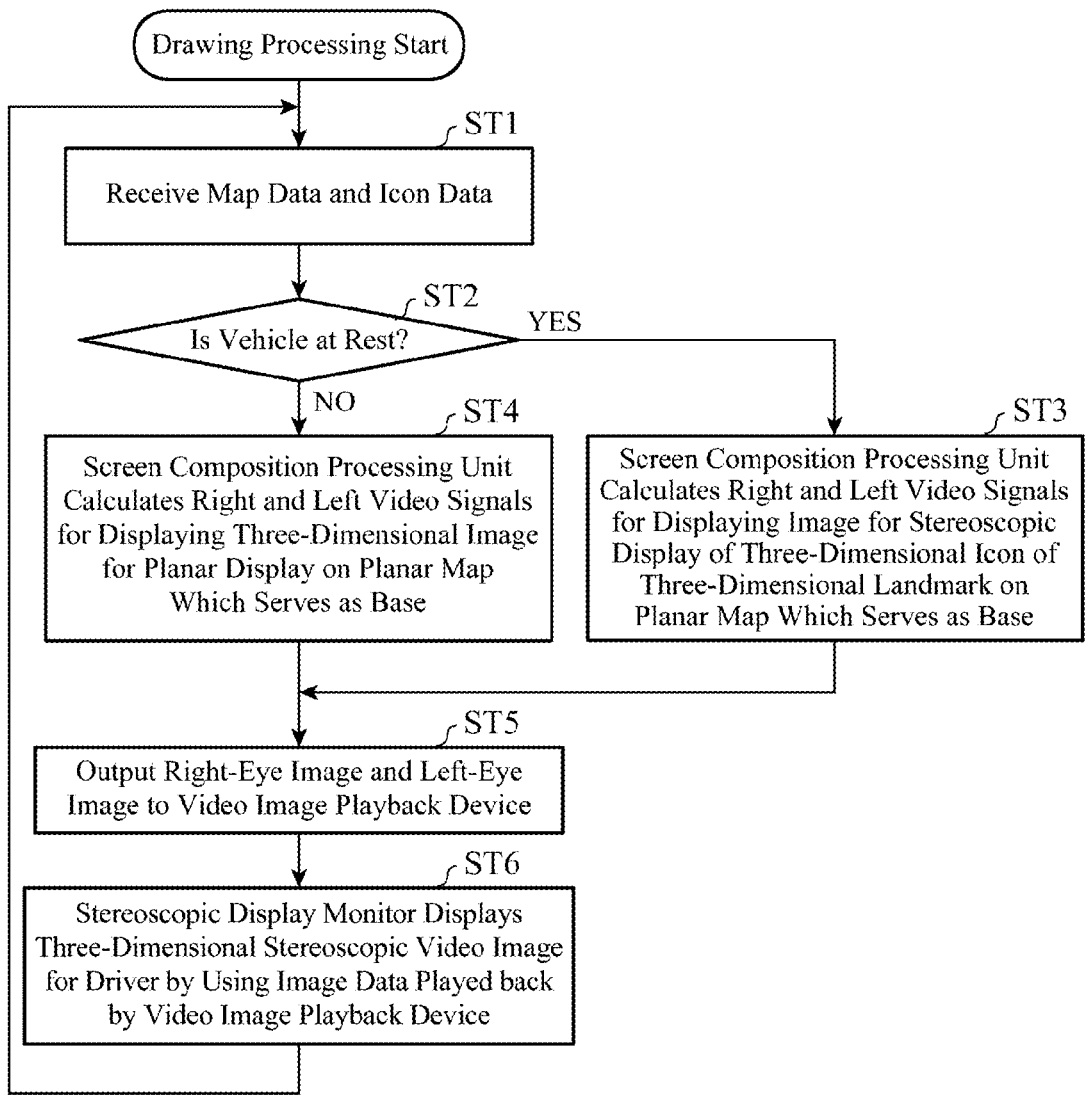
FIG. 4 is a flow chart showing a flow of a screen compositing process carried out by the 3Dimension stereoscopic display device in accordance with Embodiment 1.
Figure 5:
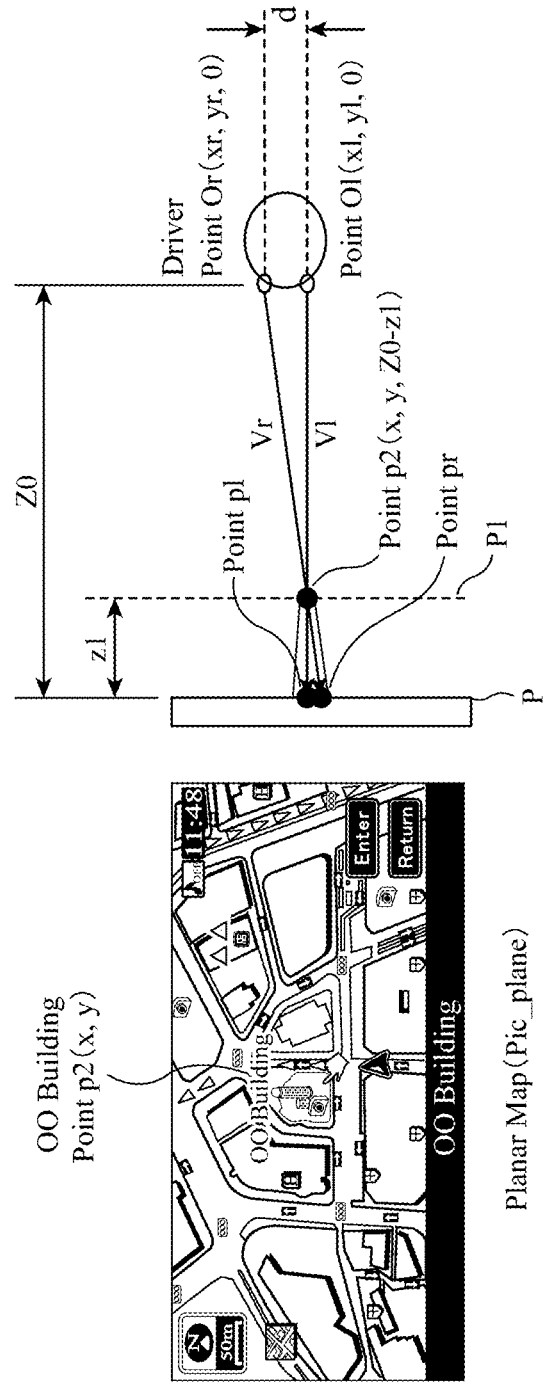
FIG. 5 is a view for explaining a screen compositing process of producing a three-dimensional stereoscopic display.
Figure 6:
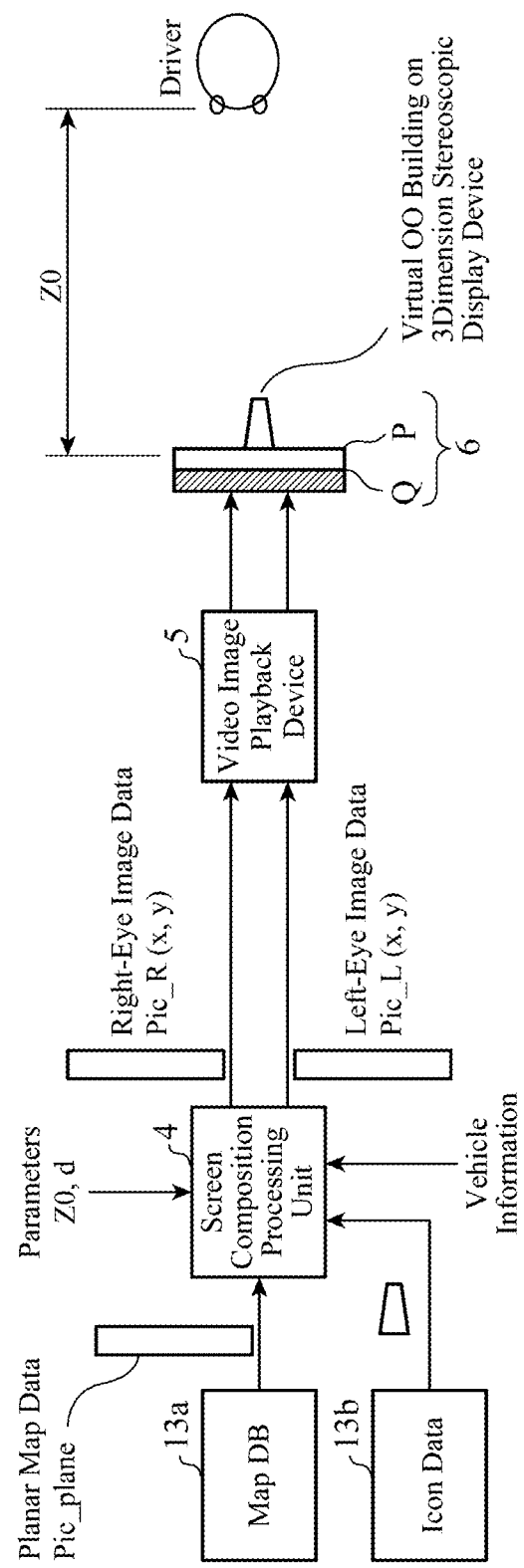
FIG. 6 is a view showing a data flow in the screen compositing process shown in FIG. 5.

FIG. 4 is a flow chart showing a flow of a screen compositing process carried out by the 3Dimension stereoscopic display device in accordance with Embodiment 1, and shows a screen compositing process of selecting a three-dimensional stereoscopic display or a display of a three-dimensional image on a planar image according to whether or not the vehicle is at rest. FIG. 5 is a view for explaining a screen compositing process of producing a three-dimensional stereoscopic display. FIG. 6 is a view showing a data flow in the screen compositing process shown in FIG. 5. Hereafter, the details of the screen compositing process will be explained with reference to FIG. 4, and FIGS. 5 and 6 will be referred to as needed.

First, the main CPU 4a reads map data from the map DB 13a stored in the HDD 13, and generates planar map data Pic_plane according to a predetermined map drawing algorithm, as shown in FIG. 6. The planar map data Pic_plane are the one about a planar map which is described in, for example, a left part of FIG. 5. The main CPU 4a also reads icon data showing stereoscopic image icons of three-dimensional landmarks which are to be displayed in a stereoscopic manner on the planar map shown by the planar map data Pic_plane from the icon data 13b stored in the HDD 13.

In FIG. 5, the position of the driver's right eye is expressed as a point Or(xr, yr, 0), the position of the driver's left eye is expressed as a point Ol(xl, yl, 0), and the gap between the left and right eyes is expressed as d. That is, the following relationship: |xr−xl|=d is established. When a distance showing the degree in which a "OO building" positioned at a point p2(x, y) on the planar map shown by the planar map data Pic_plane is floating via stereoscopic vision according to the height of the "OO building" is expressed as z1, the top surface of this building is included in a virtual stereoscopic display surface P1 based on stereoscopic vision, and is shown by a point p2(x, y, Z0-z1) on the stereoscopic display surface P1.

Right-eye image data Pic_R(x, y) of the planar map are expressed by a set of points pr at each of which a straight line (vector Vr) which connects between the point p2 on the virtual stereoscopic display surface P1 and the point Or(xr, yr, 0) which is the position of the right eye intersects the screen Q of the stereoscopic display monitor 6. More specifically, the right-eye image data Pic_R(x, y) consist of the set of points pr which are acquired by mapping the point p2 where the stereoscopic image icon of the "OO building" is positioned onto the screen Q of the stereoscopic display monitor 6. Similarly, left-eye image data Pic_L(x, y) of the planar map are expressed by a set of points p1 at each of which a straight line (vector V1) which connects between the point p2 on the virtual stereoscopic display surface P1 and the point Ol(xl, yl, 0) which is the position of the left eye intersects the screen Q of the stereoscopic display monitor 6. More specifically, the left-eye image data Pic_L(x, y) consist of the set of points p1 which are acquired by mapping the point p2 where the stereoscopic image icon of the "OO building" is positioned onto the screen Q of the stereoscopic display monitor 6.

The screen composition processing unit 4 receives the above-mentioned planar map data Pic_plane and the above-mentioned icon data (step ST1). Next, the screen composition processing unit 4 determines whether or not the vehicle is at rest on the basis of vehicle speed pulses inputted thereto from the speed sensor 10 (step ST2). When the vehicle is at rest (when YES in step ST2), the screen composition processing unit 4 calculates the points pr and pl by using the parameters Z0 and d showing the positional relationship between the driver and the screen Q of the stereoscopic display monitor 6, and the gap between the driver's eyes, the planar map data Pic_plane, and the icon data in such a way that the distance between the virtual map display surface P and each of the positions Or and Ol of the driver's eyes is equal to Z0, and the distance between the virtual stereoscopic display surface P1 and each of the positions Or and Ol of the driver's eyes is equal to (Z0-z1). More specifically, the screen composition processing unit 4 generates the right-eye image data Pic_R(x, y) and the left-eye image data Pic_L(x, y) showing an image in which the stereoscopic image icon of the "OO building" is displayed in a stereoscopic manner via stereoscopic vision.

In contrast, when the vehicle is in a travelling state (when NO in step ST2), the screen composition processing unit 4 generates right-eye image data Pic_R(x, y) and left-eye image data Pic_L(x, y) for display of a three-dimensional image of the "OO building" on the planar map (an image drawn in three dimensions on a two-dimensional plane) by using the planar map data Pic_plane and the icon data (step ST4). For example, the screen composition processing unit superimposes the three-dimensional image of the "OO building" for planar display on each of the right-eye and left-eye images.

When completing the process of step ST3 or ST4, the screen composition processing unit 4 outputs the right-eye image data Pic_R(x, y) and the left-eye image data Pic_L(x, y) which are generated thereby to the video image playback device 5 (step ST5). The video image playback device 5 plays back the right-eye image data Pic_R(x, y) and the left-eye image data Pic_L(x, y) which are generated by the screen composition processing unit 4, and outputs them to the stereoscopic display monitor 6. The stereoscopic display monitor 6 displays the left-eye image and the right-eye image in a stereoscopic manner by using the right-eye image data Pic_R(x, y) and the left-eye image data Pic_L(x, y) which are played back by the video image playback device 5 (step ST6). At this time, when the vehicle is at rest, the 3Dimension stereoscopic display device makes the stereoscopic image icon of the "OO building" look as if it is floating from the planar map (perceived to be at the height of z1) with respect to the driver's position by using stereoscopic vision. In contrast, when the vehicle is travelling, the 3Dimension stereoscopic display device displays the three-dimensional image of the "OO building" on the planar map.

Further, when the map is scrolled and when the vehicle position moves as the vehicle travels, by repeatedly performing the process shown in FIG. 4 on the planar map data which are continuously updated according to the scrolling or the movement of the vehicle position, the 3Dimension stereoscopic display device can acquire an continuous map image. In the above-mentioned explanation, the 3Dimension stereoscopic display device determines whether or not the vehicle is at rest on the basis of the vehicle speed pulses inputted thereto from the speed sensor 10. The determination of whether or not the vehicle is at rest is not limited to this example. For example, although not illustrated, the 3Dimension stereoscopic display device can determine that the vehicle is at rest when the parking brake of the vehicle is put on and the vehicle speed is "0", and then display the 3Dimension stereoscopic image. Further, because the safety regulations on HMI (Human Machine Interface) differ from country to country and state to state, the 3Dimension stereoscopic display device can switch between outputting the planar image to the playback processing unit and outputting the three-dimensional stereoscopic image to the playback processing unit according to the vehicle states.

Each of the images shown by the right-eye image data Pic_R(x, y) and the left-eye image data Pic_L(x, y) which express the three-dimensional image for planar display is the same as either of the right-eye and left-eye images, and the 3Dimension stereoscopic display device displays the map for planar display and the stereoscopic icon placed on the map (e.g., the three-dimensional image of the "OO building") on the screen Q of the stereoscopic display monitor 6. By thus using the same image as the right-eye and left-eye images for planar display, the 3Dimension stereoscopic display device can reduce the load on the image generation by the screen composition processing unit 4.

As mentioned above, the 3Dimension stereoscopic display device in accordance with this Embodiment 1 includes: the moving object state detection unit, such as the speed sensor 10, for detecting a state of the vehicle; the screen composition processing unit 4 for generating a right-eye image or video image and a left-eye image or video image for planar display or for three-dimensional stereoscopic display of an image or video image which is a display object; the video image playback device 5 for playing back the images or video images generated by the screen composition processing unit 4; and the stereoscopic display monitor unit 6 for receiving the images or video images played back by the video image playback device 5 which are the display object, and displaying the images or video images in a three-dimensional stereoscopic manner, and the screen composition processing unit 4 switches between outputting the right-eye image or video image and the left-eye image or video image for planar display to the video image playback device 5 and outputting the right-eye image or video image and the left-eye image or video image for three-dimensional stereoscopic display to the video image playback device 5 according to the state of the vehicle which is detected by the moving object state detection unit. Because the 3Dimension stereoscopic display device in accordance with this embodiment can switch between the display of the three-dimensional stereoscopic image and the display of the planar image according to the state of the vehicle, the 3Dimension stereoscopic display device can provide a user-friendly and safe in-vehicle information system 1 for three-dimensional stereoscopic display which secures the safety of the driver and provides legible information for the driver.

Embodiment 2

A 3Dimension stereoscopic display device in accordance with Embodiment 2 produces a three-dimensional stereoscopic display of a map of a road which a moving object equipped with the device was travelling (so-called street view) before the moving object has come to rest by using stereoscopic vision when the moving object is at rest, whereas the 3Dimension stereoscopic display device displays a three-dimensional image for planar display when the moving object is in a travelling state. The 3Dimension stereoscopic display device in accordance with Embodiment 2 includes a screen composition processing unit for generating a stereoscopic display screen on which the road which a vehicle is travelling is displayed in a three-dimensional stereoscopic manner when the vehicle is at rest, and the basic structure of the 3Dimension stereoscopic display device is the same as that according to above-mentioned Embodiment 1. Therefore, in the following explanation, the 3Dimension stereoscopic display device in accordance with Embodiment 2 is applied to an in-vehicle information system, and the structure of the 3Dimension stereoscopic display device will be explained with reference to FIG. 3.

Figure 7:
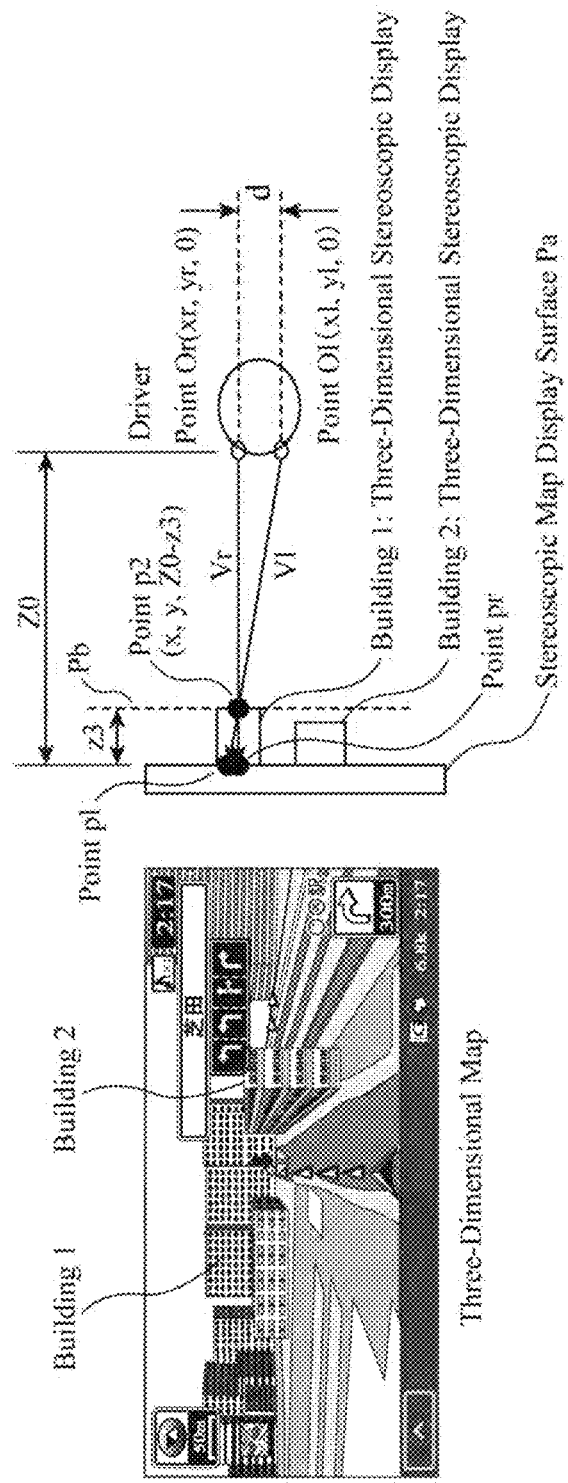
FIG. 7 is a view for explaining a screen compositing process of producing a three-dimensional stereoscopic display of a stereoscopic image of a building or the like on a map display surface P of a stereoscopic map.
Figure 8:
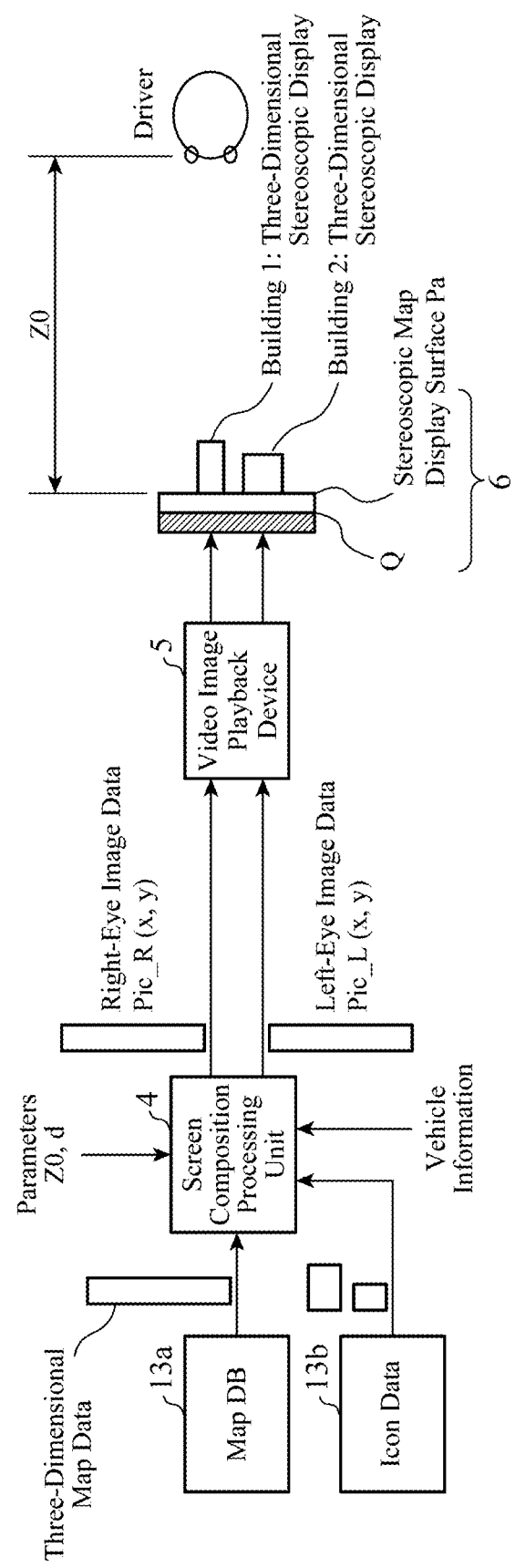
FIG. 8 is a view showing a data flow in the screen compositing process shown in FIG. 7.

Next, the operation of the 3Dimension stereoscopic display device will be explained. The 3Dimension stereoscopic display device in accordance with Embodiment 2 composites images into a 3Dimension stereoscopic image in which a stereoscopic image of a building or the like is displayed in a three-dimensional stereoscopic manner on a map display surface of a stereoscopic map, and displays the 3Dimension stereoscopic image. FIG. 7 is a view for explaining a screen compositing process of producing a three-dimensional stereoscopic display of a stereoscopic image of a building or the like on the map display surface Pa of the stereoscopic map. FIG. 8 is a view showing a data flow in the screen compositing process shown in FIG. 7. In the example shown in FIG. 7, the 3Dimension stereoscopic display device produces a three-dimensional stereoscopic display of a road along which a building 1 and a building 2 exist.

First, a main CPU 4a reads map data from a map DB 13a stored in an HDD 13, and generates three-dimensional map data according to a predetermined map drawing algorithm, as shown in FIG. 8. The three-dimensional map data show a three-dimensional map which is described in, for example, a left part of FIG. 7. The main CPU 4a also reads icon data about stereoscopic image icons of buildings or the like which are to be displayed on the three-dimensional map from icon data 13b stored in the HDD 13.

In the example shown in FIG. 7, the 3Dimension stereoscopic display device displays the three-dimensional map shown by the three-dimensional map data on the stereoscopic map display surface Pa on the screen Q of the stereoscopic display monitor 6. In addition, the 3Dimension stereoscopic display device displays the stereoscopic image icons showing the building 1 and the building 2 in such a way that each of the front sides (the sides nearest to the driver) of the stereoscopic image icons is included in the icon virtual stereoscopic display surface Pb placed at a position forward with respect to the stereoscopic map display surface Pa. The icon virtual stereoscopic display surface Pb makes the ground object represented by each stereoscopic image icon look as if its front side is displayed via stereoscopic vision, and is set to be placed in parallel at a position forward with respect to the stereoscopic map display surface Pa. Further, the icon virtual stereoscopic display surface Pb is apart from the above-mentioned stereoscopic map display surface Pa by a distance according to the degree in which each stereoscopic image icon is floating forward from the stereoscopic map display surface Pa. In the example shown in FIG. 7, the building 1 looks as if it is floating at a distance z3 from the stereoscopic map display surface Pa when viewed from the driver's position.

Right-eye image data Pic_R(x, y) of the three-dimensional map are expressed by a set of points pr at each of which an extension (vector Vr) of a straight line which connects between a point p2(x, y, Z0-z3) on the icon stereoscopic display surface Pb and the point Or(xr, yr, 0) which is the position of the right eye intersects the stereoscopic map display surface Pa. Similarly, left-eye image data Pic_L(x, y) of the three-dimensional map are expressed by a set of points p1 at each of which an extension (vector V1) of a straight line which connects between the point p2(x, y, Z0-z3) on the icon stereoscopic display surface Pb and the point Ol(xl, yl, 0) which is the position of the left eye intersects the stereoscopic map display surface Pa.

When determining that the vehicle is at rest from a detection signal of a speed sensor 10, a screen composition processing unit 4 calculates the points pr and pl by using the three-dimensional map data, the parameters Z0 and d, and the icon data in such a way that the distance between the stereoscopic map display surface Pa of the three-dimensional map and the position of the driver's eyes is equal to Z0, and the distance between the icon virtual stereoscopic display surface Pb of the buildings 1 and 2 and the position of the driver's eyes is equal to (Z0-z3), and generates right-eye image data Pic_R(x, y) and left-eye image data Pic_L(x, y) and outputs these image data to a video image playback device 5, like that according to above-mentioned Embodiment 1.

When the vehicle is at rest, the video image playback device 5 plays back the right-eye image data Pic_R(x, y) and the left-eye image data Pic_L(x, y) which are generated by the screen composition processing unit 4 and outputs these image data played back thereby to a stereoscopic display monitor 6, as mentioned above. The stereoscopic display monitor 6 displays the three-dimensional map and the stereoscopic image icons of the buildings in a stereoscopic manner by using the right-eye image data Pic_R(x, y) and the left-eye image data Pic_L(x, y) which are played back by the video image playback device 5. At this time, the icon images of the buildings 1 and 2 look as if they are floating on the three-dimensional map via stereoscopic vision when viewed from the driver's position.

When the vehicle is travelling, the screen composition processing unit 4 generates a right-eye image and a left-eye image for display of a three-dimensional image of the buildings 1 and 2 on the planar map by using the planar map data and the icon data, like that according to above-mentioned Embodiment 1. As a result, the three-dimensional image of the buildings 1 and 2 is displayed on the planar map on the stereoscopic display monitor 6.

Figure 9:
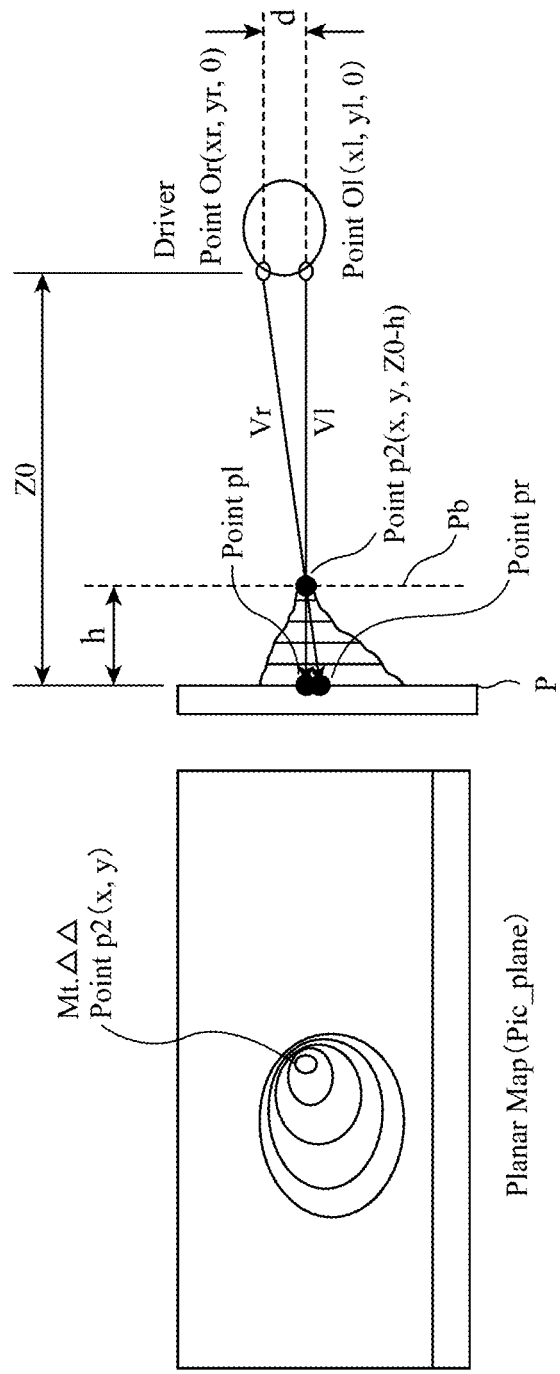
FIG. 9 is a view for explaining a screen compositing process of producing a three-dimensional stereoscopic display of a stereoscopic image of a mountain or the like which is expressed by contour lines on a map display surface of a stereoscopic map.
Figure 10:
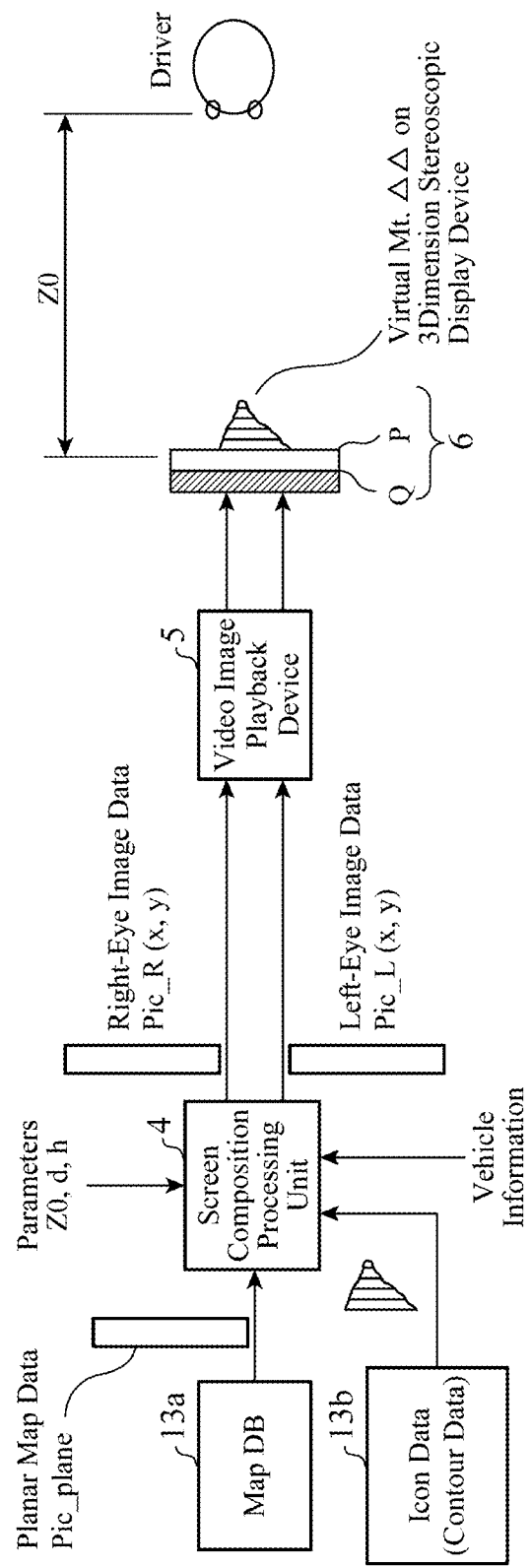
FIG. 10 is a view showing a data flow in the screen compositing process shown in FIG. 9.

Further, Embodiment 2 can be applied to a stereoscopic topographical model and a stereoscopic display based on a contour line display. FIG. 9 is a view for explaining a screen compositing process of producing a three-dimensional stereoscopic display of a stereoscopic image of a mountain or the like which is expressed by contour lines on the map display surface P of a stereoscopic map. FIG. 10 is a view showing a data flow in the screen compositing process shown in FIG. 9. In the example shown in FIG. 9, the 3Dimension stereoscopic display device produces a three-dimensional stereoscopic display of "Mt. ΔΔ" on the planar map when the vehicle is at rest.

First, the main CPU 4a reads the map data from the map DB 13a stored in the HDD 13, and generates planar map data Pic_plane according to a predetermined map drawing algorithm, as shown in FIG. 10. The planar map data Pic_plane show the planar map which is described in, for example, a left part of FIG. 9. The main CPU 4a also reads icon data about the icon of a mountain or the like which is to be displayed on the planar map from the icon data 13b stored in the HDD 13.

In the example shown in FIG. 9, the 3Dimension stereoscopic display device displays the planar map shown by the planar map data on the map display surface P on the screen Q of the stereoscopic display monitor 6. In addition, the 3Dimension stereoscopic display device displays the stereoscopic image icon showing "Mt. ΔΔ" in such a way that the top part of the stereoscopic image icon (the part nearest to the driver) is included in the icon virtual stereoscopic display surface Pb which is apart from the map display surface P by a distance h according to the altitude of "Mt. ΔΔ." In the example shown in FIG. 9, "Mt. ΔΔ" looks as if it is floating at the distance h from the map display surface P via stereoscopic vision when viewed from the driver's position.

Right-eye image data Pic_R(x, y) of the planar map are expressed by a set of points pr at each of which an extension (vector Vr) of a straight line which connects between a point $p2(x, y, Z0-h)$ on the icon stereoscopic display surface Pb and the point $Or(xr, yr, 0)$ which is the position of the right eye intersects the map display surface P. Similarly, left-eye image data Pic_L(x, y) of the planar map are expressed by a set of points pl at each of which an extension (vector Vl) of a straight line which connects between the point $p2(x, y, Z0-h)$ on the icon stereoscopic display surface Pb and the point $Ol(xl, yl, 0)$ which is the position of the left eye intersects the map display surface P.

When determining that the vehicle is at rest from the detection signal of the speed sensor 10, the screen composition processing unit 4 calculates the points pr and pl in the same way that that according to above-mentioned Embodiment 1 does by using the planar map data, the parameters Z0, d, and h, and the icon data in such a way that the distance between the map display surface P and the position of the driver's eyes is equal to Z0, and the distance between the icon stereoscopic display surface Pb of "Mt. ΔΔ" and the position of the driver's eyes is equal to (Z0-z3), and generates right-eye image data Pic_R(x, y) and left-eye image data Pic_L(x, y) and outputs these image data to the video image playback device 5.

When the vehicle is at rest, the video image playback device 5 plays back the right-eye image data Pic_R(x, y) and the left-eye image data Pic_L(x, y) which are generated by the screen composition processing unit 4 and outputs these image data played back thereby to the stereoscopic display monitor 6, as mentioned above. The stereoscopic display monitor 6 displays the planar map and the stereoscopic image icon of "Mt. ΔΔ" in a stereoscopic manner by using the right-eye image data Pic_R(x, y) and the left-eye image data Pic_L(x, y) which are played back by the video image playback device 5. At this time, the icon image of "Mt. ΔΔ" looks as if it is floating on the planar map via stereoscopic vision.

As mentioned above, in the 3Dimension stereoscopic display device in accordance with this Embodiment 2, when the moving object state detection unit detects that the vehicle is travelling, the screen composition processing unit 4 generates a right-eye image or video image and a left-eye image or video image for planar display of an image or video image which is a display object, whereas when the moving object state detection unit detects that the vehicle is at rest, the screen composition processing unit 4 generates a right-eye image or video image and a left-eye image or video image for three-dimensional stereoscopic display of the image or video image which is the display object. By doing in this way, the 3Dimension stereoscopic display device displays a 3Dimension stereoscopic image of a map by using stereoscopic vision when the vehicle is at rest, whereas the 3Dimension stereoscopic display device displays a normal planar map and a stereoscopic image icon on a planar image when the vehicle is travelling. Therefore, the 3Dimension stereoscopic display device can provide a safe in-vehicle information system 1 for three-dimensional stereoscopic display which secures the safety of the driver and provides legible information for the driver.

For convenience of explanation, a three-dimensional building displayed on the screen is explained as an icon in above-mentioned Embodiments 1 and 2. Each three-dimensional building displayed on the screen can be stored in the icon data 13b or the map DB13a as three-dimensional data. For example, this three-dimensional data is stored in an OpenGL form which is a standard form of three-dimensional image stored data. Further, the screen composition processing unit 4 can composite images into an image for three-dimensional stereoscopic display on the basis of this three-dimensional data. In addition, when the vehicle is travelling, the 3Dimension stereoscopic display device can display a three-dimensional building in an OpenGL form for planar display on a plane in a three-dimensional manner.

Embodiment 3

In Embodiment 3, a case in which a 3Dimension stereoscopic display device displays a software button for operational input, such as an icon, on another virtual display surface parallel to the map display surface of a planar map in a stereoscopic manner will be described. The 3Dimension stereoscopic display device in accordance with Embodiment 3 includes a screen composition processing unit for generating a stereoscopic display screen on which a software button for operational input, such as an icon, is displayed on another virtual display surface parallel to the map display surface of a planar map in a stereoscopic manner, and the basic structure of the 3Dimension stereoscopic display device is the same as that according to above-mentioned Embodiment 1. Therefore, in the following explanation, the 3Dimension stereoscopic display device in accordance with Embodiment 3 is applied to an in-vehicle information system, and the structure of the 3Dimension stereoscopic display device will be explained with reference to FIG. 3.

Figure 11:
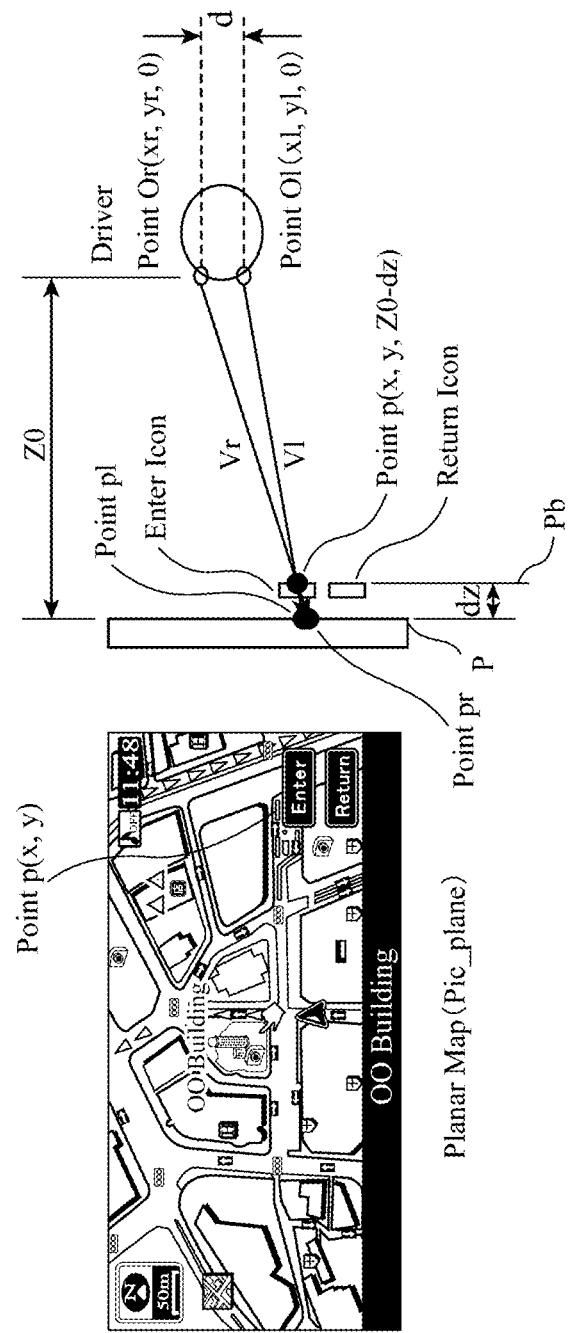
FIG. 11 is a view for explaining a screen compositing process of placing a virtual display surface of icons at a position forward with respect to a map display surface of a planar map.
Figure 12:
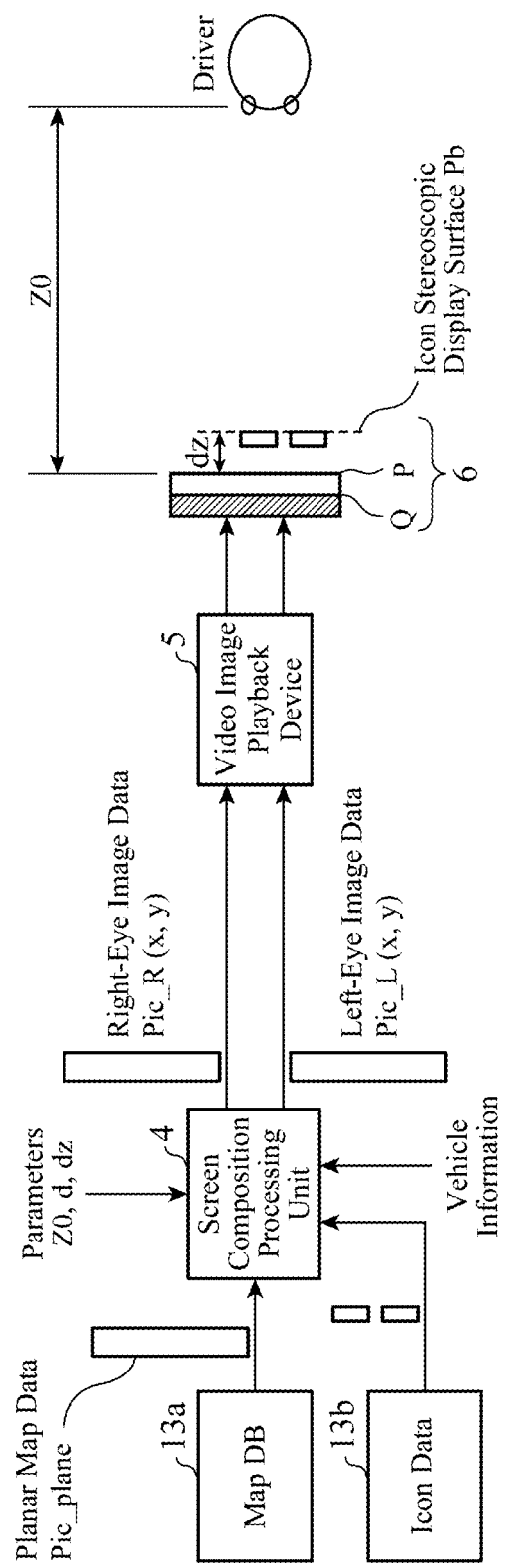
FIG. 12 is a view showing a data flow in the screen compositing process shown in FIG. 11.

Next, the operation of the 3Dimension stereoscopic display device will be explained. FIG. 11 is a view for explaining a screen compositing process of placing the virtual display surface of icons at a position forward with respect to the map display surface of a planar map. FIG. 12 is a view showing a data flow in the screen compositing process shown in FIG. 11. In the example shown in FIG. 11, the 3Dimension stereoscopic display device displays each of the icons of an enter button and a return button on the icon virtual stereoscopic display surface Pb placed at a position forward with respect to the virtual map display surface P of the planar map.

First, a main CPU 4*a* reads map data from a map DB 13*a* stored in an HDD 13, and generates planar map data Pic_plane according to a predetermined map drawing algorithm, as shown in FIG. 12. The planar map data Pic_plane show the planar map which is described in, for example, a left part of FIG. 11. The main CPU 4*a* also reads the icon data about the icons to be displayed on the planar map shown by the planar map data Pic_plane from icon data 13*b* stored in the HDD 13.

In the example shown in FIG. 11, the 3Dimension stereoscopic display device displays the enter button and the return button which are operation icons on the icon virtual stereoscopic display surface Pb placed at a position forward with respect to the map display surface P of the planar map. More specifically, when the distance between the map display surface P of the planar map and the icon virtual stereoscopic display surface Pb is expressed as dz, each of the icons of the enter button and the return button looks as if it is floating at the distance dz from the planar map via stereoscopic vision when viewed from the driver's position.

Right-eye image data Pic_R(x, y) of the planar map are expressed by a set of points pr at each of which an extension (vector Vr) of a straight line which connects between a point p(x, y, Z0-dz) on the icon stereoscopic display surface Pb and the point Or(xr, yr, 0) which is the position of the right eye intersects the map display surface P of the planar map (which is the same as the screen Q of a stereoscopic display monitor 6). Similarly, left-eye image data Pic_L(x, y) of the planar map are expressed by a set of points pl(xl, yl, Z0) at each of which an extension (vector Vl) of a straight line which connects between the point p(x, y, Z0-dz) on the icon stereoscopic display surface Pb and the point Ol(xl, yl, 0) which is the position of the right eye intersects the map display surface P.

When determining that a vehicle is at rest from a detection signal of a speed sensor 10, a screen composition processing unit 4 calculates the points pr and pl in the same way that that according to above-mentioned Embodiment 1 does by using the planar map data Pic_plane, the parameters Z0, d, and dz, and the icon data in such a way that the distance between the map display surface P and the position of the driver's eyes is equal to Z0, and the distance between the stereoscopic display surface Pb of the icons and the position of the driver's eyes is equal to (Z0-dz), and generates right-eye image data Pic_R(x, y) and left-eye image data Pic_L(x, y) and outputs these image data to a video image playback device 5.

The video image playback device 5 plays back the right-eye image data Pic_R(x, y) and the left-eye image data Pic_L(x, y) which are generated by the screen composition processing unit 4, and outputs them to the stereoscopic display monitor 6. The stereoscopic display monitor 6 displays the planar map and the icons in a stereoscopic manner by using the right-eye image data Pic_R(x, y) and the left-eye image data Pic_L(x, y) which are played back by the video image playback device 5. At this time, the icon image looks as if it is floating on the planar map shown by the planar map data Pic_plane via stereoscopic vision when viewed from the driver's position.

Further, the 3Dimension stereoscopic display device can make an icon selected through the user's operation look as if it is floating at a distance longer than the distance dz between the map display surface P of the planar map and the icon virtual stereoscopic display surface Pb on which the other icons are displayed in a stereoscopic manner. The 3Dimension stereoscopic display device can further change the color of the selected icon to display this icon in the changed color. In contrast with this, the 3Dimension stereoscopic display device can reduce the distance dz for the icons other than the icon selected through the user's operation to be shorter than that for the icon selected.

As mentioned above, the 3Dimension stereoscopic display device in accordance with this Embodiment 3 includes: the moving object state detection unit, such as the speed sensor 10, for detecting the state of the vehicle; the screen composition processing unit 4 for generating a right-eye image or video image and a left-eye image or video image for planar display or for three-dimensional stereoscopic display of an image or video image which is a display object; the video image playback device 5 for playing back the images or video images generated by the screen composition processing unit 4; and the stereoscopic display monitor unit 6 for receiving the images or video images played back by the video image playback device 5 which are the display object, and displaying the images or video images in a three-dimensional stereoscopic manner, and the screen composition processing unit 4 generates a right-eye image or video image and a left-eye image or video image in which the position of a virtual display surface for three-dimensional stereoscopic display of the image or video image which is the display object is changed according to the state of the vehicle which is detected by the moving object state detection unit. Particularly, by setting the display surface Pb on which the stereoscopic image icons are displayed to be placed at a position forward (at a position closer to the driver) with respect to the map display surface P of the planar map which is the base when the vehicle is at rest according to the speed of the vehicle which is detected by the moving object state detection unit, the 3Dimension stereoscopic display device can provide a safe in-vehicle information system 1 for three-dimensional stereoscopic display which can provide legible information for the driver.

Embodiment 4

In above-mentioned Embodiments 1 to 3, the case in which the screen compositing process is implemented through the software processing carried out by the main CPU 4*a* is shown. In this Embodiment 4, a structure for carrying out a screen compositing process at a high speed by using hardware logic will be described.

Figure 13:
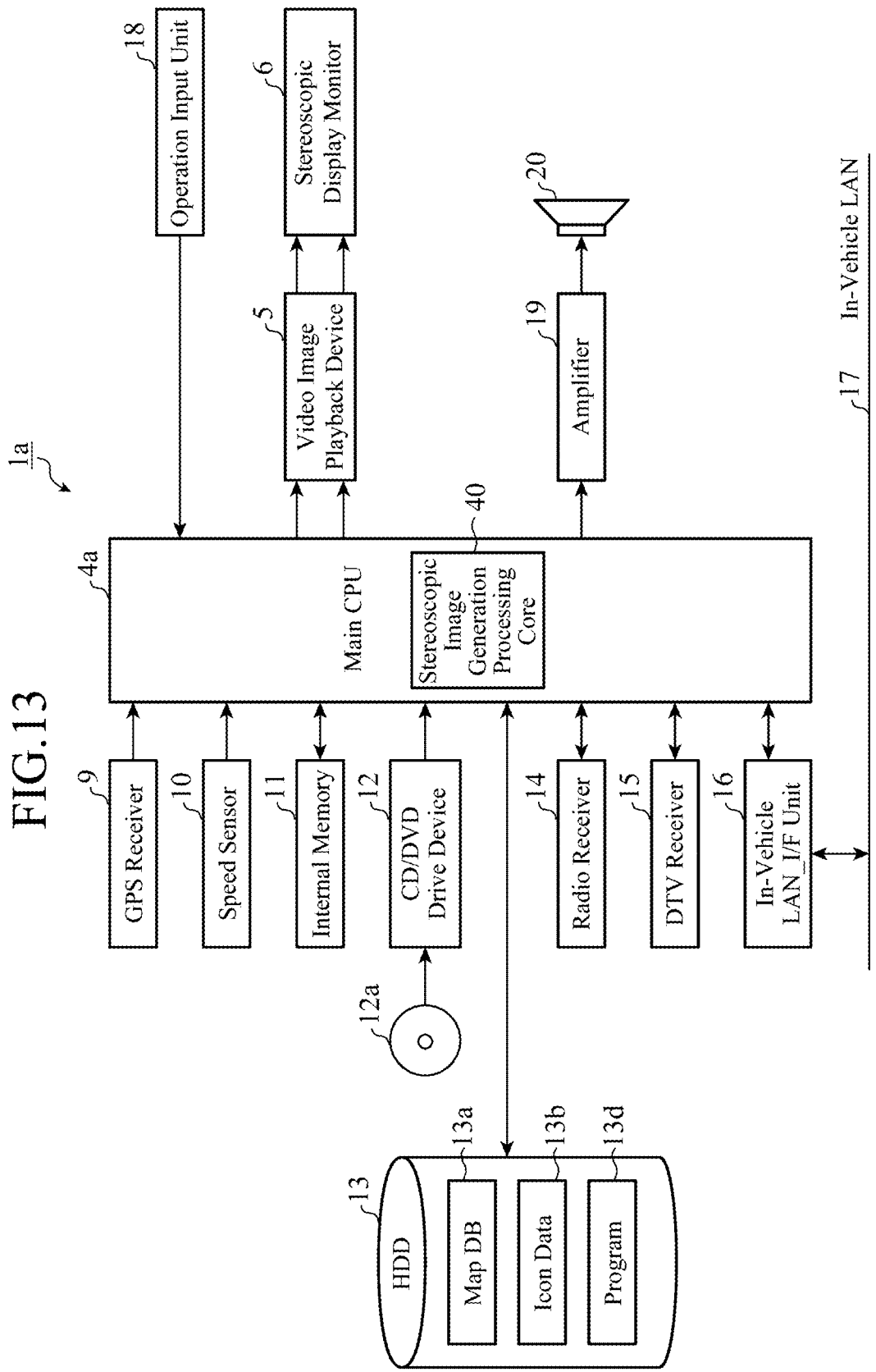
FIG. 13 is a block diagram showing the structure of an in-vehicle information system which uses a 3Dimension stereoscopic display device in accordance with Embodiment 4 of the present invention.

FIG. 13 is a block diagram showing the structure of an in-vehicle information system which uses a 3Dimension stereoscopic display device in accordance with Embodiment 4 of the present invention. Referring to FIG. 13, the in-vehicle information system 1*a* differs from that having the structure of FIG. 3 shown in above-mentioned Embodiment 1 in that a stereoscopic image generation processing core 40 for carrying out a screen compositing process at a high speed by using hardware logic is formed on the same LSI as that disposed in a main CPU 4*a*. Instead of forming the stereoscopic image generation processing core on the same LSI, only the hardware logic for carrying out the screen compositing process can be formed as a dedicated LSI, and this dedicated LSI can be constructed as the stereoscopic image generation processing core 40 and connected to the main CPU 4a.

Figure 14:
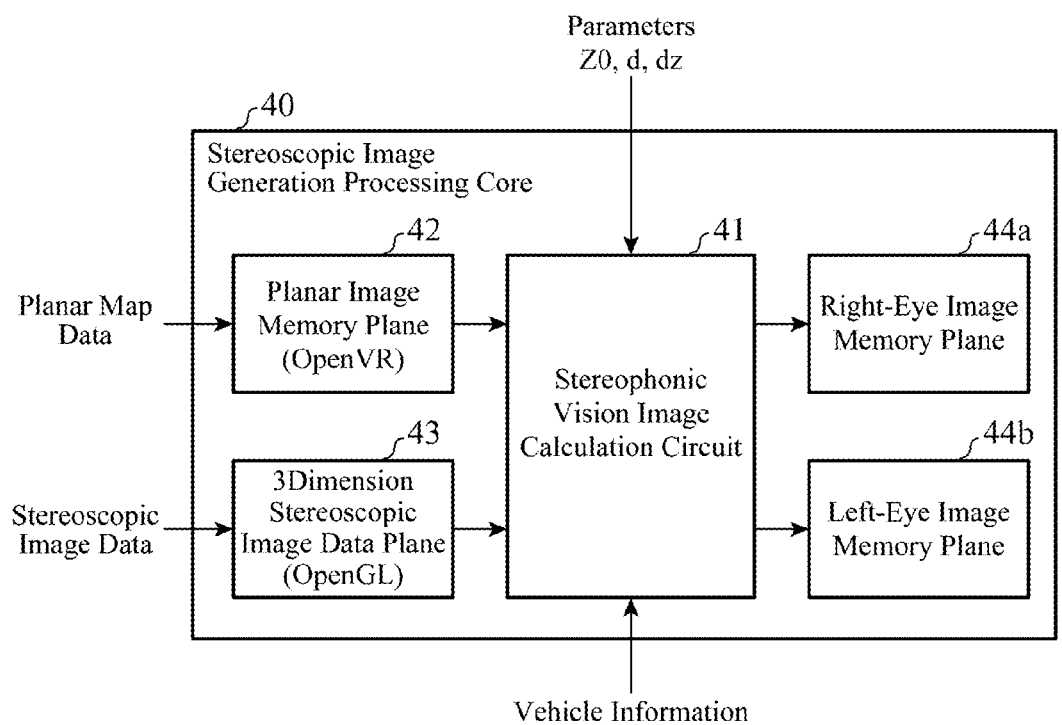
FIG. 14 is a block diagram showing the structure of a stereoscopic image generating process core.

FIG. 14 is a block diagram showing the structure of the stereoscopic image generation processing core. Referring to FIG. 14, the stereoscopic image generation processing core 40 is provided with a stereoscopic vision image calculation circuit 41, a planar image memory plane 42, a 3Dimension stereoscopic image data plane 43, a right-eye image memory plane 44a, and a left-eye image memory plane 44b. The planar image memory plane 42 receives and stores planar image data showing a planar image which is information to be displayed. In this case, the planar image memory plane receives planar map data from a map DB 13a in an HDD 13.

The 3Dimension stereoscopic image data plane 43 is a memory plane for receiving and storing stereoscopic image data showing a stereoscopic image which is information to be displayed. For example, the 3Dimension stereoscopic image data plane receives stereoscopic image data about icons from icon data 13b in the HDD 13. The stereoscopic vision image calculation circuit 41 receives the planar map data from the planar image memory plane 42, the stereoscopic image data from the 3Dimension stereoscopic image data plane 43, parameters Z0, d, and dz from an internal memory 11 and so on, and carries out the same screen compositing process as that shown in either one of above-mentioned Embodiments 1 to 3 by using these data.

The right-eye image memory plane 44a receives and stores right-eye image data acquired as the result of the screen compositing process carried out by the stereoscopic vision image calculation circuit 41. Further, the left-eye image memory plane 44b receives and stores the left-eye image data acquired as the result of the screen compositing process carried out by the stereoscopic vision image calculation circuit 41. The right-eye image memory plane 44a and the left-eye image memory plane 44b output right-eye image data and left-eye image data to a video image playback device 5 at a predetermined time.

The stereoscopic vision image calculation circuit 41 selects a three-dimensional image for three-dimensional stereoscopic display or a three-dimensional image for planar display according to speed information about the speed of a vehicle as vehicle information. The stereoscopic vision image calculation circuit selects a three-dimensional stereoscopic display which makes ground objects and so on look as if they are floating on the map when the vehicle is at rest, whereas the stereoscopic vision image calculation circuit selects a three-dimensional image for planar display in which ground objects and so on are displayed on the planar map in a stereoscopic manner when the vehicle is travelling.

As the planar image data stored in the planar image memory plane 42, an expression in a two-dimensional drawing library, such as OpenVR, can be used. Further, as the stereoscopic image data stored in the 3Dimension stereoscopic image data plane 43, an expression in a three-dimensional drawing library, such as OpenGL, can be used. Because these expressions in the libraries are standard I/Fs, the convenience of the stereoscopic image generation processing core 40 can be improved.

As mentioned above, because the 3Dimension stereoscopic display device in accordance with this Embodiment 4 includes the stereoscopic image generation processing core 40 which is a dedicated LSI for carrying out the screen compositing process by using hardware logic, the 3Dimension stereoscopic display device can carry out the image compositing process at a high speed.

In above-mentioned Embodiments 1 to 4, the 3Dimension stereoscopic display device carries out a control operation of not producing any display of a 3Dimension stereoscopic image when the vehicle is travelling. As an alternative, the 3Dimension stereoscopic display device can produce a three-dimensional stereoscopic display of a specific icon, such as an icon for operational input or an icon showing cardinal directions, when the vehicle is travelling. For example, the 3Dimension stereoscopic display device produces a three-dimensional stereoscopic display of only an icon which enables the user to perform a function which is permitted to be performed when the vehicle is travelling. More specifically, in a case in which an operation performed on an icon image can cause a function associated with the icon image to be performed, the screen composition processing unit 4 generates a right-eye image and a left-eye image for three-dimensional stereoscopic display of only icon images corresponding to functions which are permitted to be performed when the vehicle is travelling, and the stereoscopic display monitor 6 produces a three-dimensional stereoscopic display of the right-eye image and the left-eye image for three-dimensional stereoscopic display of the icon images which are played back by the video image playback device 5. In this case, fixing the heights of icons (the degree in which each icon is floating via stereoscopic vision) produces a more legible three-dimensional stereoscopic display.

Embodiment 5

Figure 15:
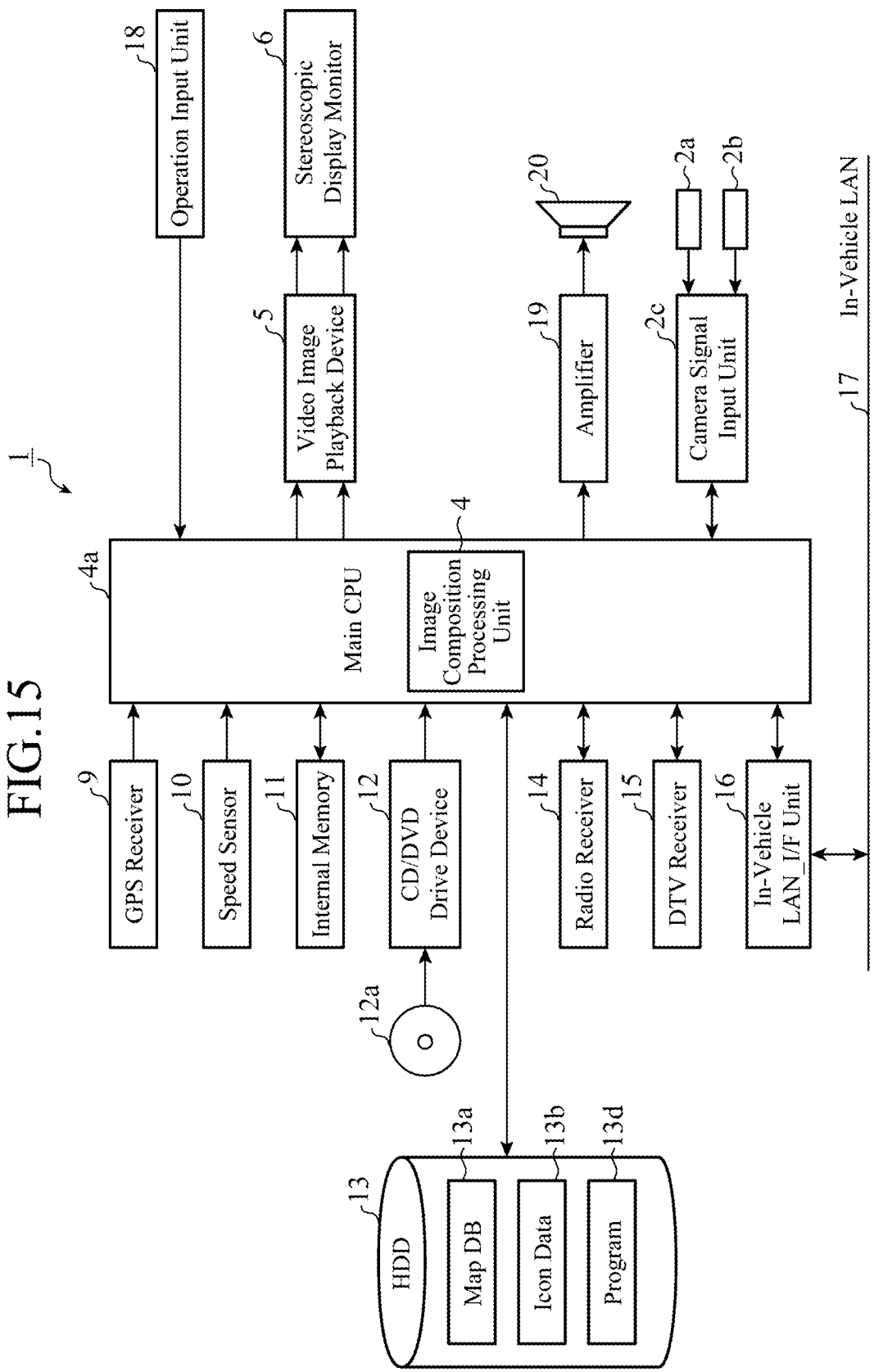
FIG. 15 is a block diagram showing the structure of an in-vehicle information system which uses a 3Dimension stereoscopic display device in accordance with Embodiment 5 of the present invention.

An in-vehicle information system in accordance with this Embodiment 5 includes two right and left back cameras each for capturing an image of an area in the back of a vehicle to acquire a right-eye image and a left-eye image as a back monitor image, and, when the driver reverses the vehicle, produces a three-dimensional stereoscopic display of the back monitor image automatically. FIG. 15 is a block diagram showing the structure of the in-vehicle information system which uses a 3Dimension stereoscopic display device in accordance with Embodiment 5 of the present invention. Referring to FIG. 15, the in-vehicle information system 1 includes the left-eye camera 2a, the right-eye camera 2b, and a camera signal input unit 2c in addition to the structure shown in FIG. 3 and explained in above-mentioned Embodiment 1, and functions as a stereoscopic display system 1A shown in FIG. 1 regarding a display of an image, such as a map, and a video image. While this in-vehicle information system 1 operates in substantially the same way that the system shown in above-mentioned Embodiment 1 operates, the in-vehicle information system 1 differs from that in accordance with above-mentioned Embodiment 1 in that the in-vehicle information system produces a three-dimensional stereoscopic display of the back monitor image automatically when the driver reverses the vehicle.

For example, when a reverse of the vehicle is detected, a screen composition processing unit 4 commands the camera signal input unit 2c to acquire a right-eye image and a left-eye image of an area in the back of the vehicle which are captured by the left-eye camera 2a and the right-eye camera 2b. As a method of detecting a reverse of the vehicle, for example, a sensor for recognizing the shift position of the shift lever or a circuit for detecting lighting of a back lamp for illuminating an area in the back of the vehicle is disposed. More specifically, each of these sensors functions as a moving object state detection unit by notifying the result of the detection to the screen composition processing unit 4 via an in-vehicle LAN_I/F unit 16.

The screen composition processing unit 4 then performs a 3Dimension stereoscopic image compositing process on the right-eye image data and the left-eye image data about the images of the area in the back of the vehicle which are acquired from the camera signal input unit 2c, and outputs the right-eye image data and the left-eye image data to a video image playback device 5 as a back monitor image. For example, the screen composition processing unit carries out a 3Dimension stereoscopic image compositing process of compositing each of the right and left images and character information showing the distance between the vehicle and an obstacle existing in the back of the vehicle in such a way that the character information is displayed in a planar manner. The video image playback device 5 plays back the back monitor image inputted thereto from the screen composition processing unit 4, and outputs the back monitor image to a stereoscopic display monitor 6. The stereoscopic display monitor 6 produces a three-dimensional stereoscopic display of the captured image of the area in the back of the vehicle by using the right-eye image data and the left-eye image data about the right and left images of the area in the back of the vehicle which are played back by the video image playback device 5.

By carrying out the compositing process of generating a 3Dimension stereoscopic image in the above-mentioned way, the screen composition processing unit 4 displays the character information showing the distance between the vehicle and an obstacle existing in the back of the vehicle in a planar manner on the screen of the stereoscopic display monitor 6. By doing in this way, the in-vehicle information system can implement a user-friendly parking assistance system which can express an actual video image and any character information while making a clear distinction between them. The distance between the vehicle and an obstacle can be acquired by using a back sensor (not shown) for detecting an obstacle existing in the back of the vehicle or by carrying out image recognition on the video images captured with the cameras 2a and 2b.

Further, a guideline, which is used for parking support, for showing the direction in which the vehicle should travel can be displayed in a three-dimensional stereoscopic manner. More specifically, when it is detected that the vehicle is reversing, the screen composition processing unit 4 superimposes a guideline shown by a three-dimensional stereoscopic line on the image acquired from the camera signal input unit 2c. The stereoscopic display monitor 6 displays the 3Dimension stereoscopic image which is played back by the video image playback device 5 and in which the guideline is superimposed on the back monitor image in a three-dimensional stereoscopic manner.

As mentioned above, the in-vehicle information system in accordance with this Embodiment 5 includes the back camera unit which is comprised of the cameras 2a and 2b each for capturing an image of an object to be captured in the back of the vehicle to acquire a 3Dimension stereoscopic image of the object to be captured, and the camera signal input unit 2c, and when it is detected that the vehicle is reversing, the screen composition processing unit 4 outputs the 3Dimension stereoscopic image acquired by the back camera unit to the video image playback device 5, and the stereoscopic display monitor 6 receives the 3Dimension stereoscopic image played back by the video image playback device 5 and displays the 3Dimension stereoscopic image in a three-dimensional stereoscopic manner. Because the in-vehicle information system is constructed in this way, the in-vehicle information system can implement a user-friendly parking support which provides a legible image of an area in the back of the vehicle for the driver when the driver is reversing the vehicle.

Further, when it is detected that the vehicle is reversing, the screen composition processing unit 4 superimposes, as a three-dimensional stereoscopic line, a guideline showing the direction in which the vehicle reversing is travelling on the 3Dimension stereoscopic image acquired by the back camera unit, and the stereoscopic display monitor 6 receives the 3Dimension stereoscopic image which is played back by the video image playback device 5 and on which the guideline is superimposed, and displays the 3Dimension stereoscopic image in a three-dimensional stereoscopic manner. By doing in this way, the in-vehicle information system can implement a user-friendly parking support which makes the image of an area in the back of the vehicle and the guideline become legible when the driver is reversing the vehicle.

Further, in above-mentioned Embodiments 1 to 5, in order to show that each icon displayed in a three-dimensional stereoscopic manner is operated when the user operates the icon, each icon for operational input can be displayed at a level different according to its state. For example, in the case of a software button icon, the distance $dz$ between the map display surface P of a planar map, and the icon virtual stereoscopic display surface Pb of the icon is shortened when the icon is pushed down. By doing in this way, the in-vehicle information system makes it easy for the user to visually recognize that an icon displayed in a three-dimensional stereoscopic manner is operated when the user operates the icon.

In addition, instead of determining whether or not to produce a three-dimensional stereoscopic display according to whether the vehicle is travelling or at rest, the 3Dimension stereoscopic display device according to above-mentioned Embodiment 1 can change the degree in which the image displayed in a three-dimensional stereoscopic manner is floating forward from the screen according to the vehicle speed of the vehicle (the traveling speed of the moving object holding the device). More specifically, the screen composition processing unit 4 generates a right-eye image or video image and a left-eye image or video image in which the position of a virtual display surface for three-dimensional stereoscopic display of the image or video image which is the display object is changed according to the vehicle speed of the vehicle, and the stereoscopic display monitor 6 produces a three-dimensional stereoscopic display of the right-eye image or video image and the left-eye image or video image for three-dimensional stereoscopic display. For example, in the example shown in FIG. 5, although the distance showing the degree in which the stereoscopic image icon of a "OO building" is floating via stereoscopic vision is set to $z1$ according to the height of the "OO building", the distance $z1$ can be divided by a predetermined value D1 when the vehicle is travelling. Further, a distance showing the degree in which an icon which looks as if it is floating closest to the viewer via stereoscopic vision (e.g., the icon of the ground object having the highest height), among icons displayed in a stereoscopic manner on the map, is floating is set to be a predetermined value D2. In addition, when the travelling speed of the vehicle is higher than a predetermined threshold, the above-mentioned values D1 and D2 can be changed in such a way that the degrees in which icons are floating via stereoscopic vision are reduced. In addition, the user can be allowed to freely set a distance showing the degree in which icons and landmarks are floating via stereoscopic vision on a map displayed in a three-dimensional stereoscopic manner.

In addition to switching between a 3Dimension stereoscopic image display and a planar display according to whether the vehicle is travelling or at rest, the 3Dimension stereoscopic display device according to above-mentioned Embodiment 1 can determine whether it is daytime or nighttime from weather conditions or an illumination signal according to the user's liking, and can switch between a 3Dimension stereoscopic image display and a planar display and change the degree in which icons are floating. For example, a camera for capturing an image of an area outside the vehicle is disposed in the vehicle, and an image recognition determining unit for carrying out an image recognition process on the image captured by the camera to determine weather conditions in the outside area and to acquire an illumination signal, and then determining whether it is daytime or nighttime is disposed in the main CPU 4a, so that a detection unit (moving object state detection unit) for detecting the state of the surrounding environment of the vehicle consists of the camera and the image recognition determining unit. The screen composition processing unit 4 switches between a 3Dimension stereoscopic image display and a planar display and changes the degree in which icons are floating according to the result of the detection carried out by this detection unit.

Further, although the case in which a planar map is displayed in a stereoscopic manner is shown in above-mentioned Embodiments 1 to 5, the present invention can also be applied to a display of information, such as a menu screen for an AV system, vehicle information, or safety information, as long as the information is typical information displayed on the in-vehicle information system. For example, the present invention can be used for a display of an icon for control of an air conditioner, a meter panel in the dashboard, information about the fuel efficiency of the vehicle, preventive safety information, VICS (registered trademark) information, or the like.

In addition, although the case in which a stereoscopic display which is viewed stereoscopically with the naked eye is produced is shown in above-mentioned Embodiments 1 to 5, the present invention can also use a stereoscopic display method of providing a stereoscopic image by using a polarization eyeglass.

Further, although the case in which the 3Dimension stereoscopic display device in accordance with the present invention is applied to an in-vehicle information system is shown in above-mentioned Embodiments 1 to 5, the 3Dimension stereoscopic display device in accordance with the present invention can be applied to any display device having such a stereoscopic display monitor as above mentioned. For example, the 3Dimension stereoscopic display device in accordance with the present invention can be applied to not only an in-vehicle navigation device, but also an RSE (Rear Seat Entertainment) display device, a television set, and a display for use in a mobile telephone terminal or a mobile information terminal (PDA; Personal Digital Assistance). Further, the 3Dimension stereoscopic display device in accordance with the present invention can be applied to a display device, such as a PND (Portable Navigation Device) which a person carries onto a moving object, such as a car, a railroad, a ship, or an airplane, to use it. In this case, whether or not the above-mentioned moving object is moving can be determined by using detection information from an acceleration sensor mounted in the device such as a PND or a mobile telephone terminal. In a case in which a 3Dimension stereoscopic display device in accordance with the present invention is applied to a mobile telephone terminal, the 3Dimension stereoscopic display device changes a three-dimensional stereoscopic display according to whether or not the user carrying this device is walking.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the 3Dimension stereoscopic display device in accordance with the present invention can improve the visibility of a 3Dimension stereoscopic image or a 3Dimension stereoscopic movie, the 3Dimension stereoscopic display device is suitable for use in a display device disposed in an in-vehicle information system.

The invention claimed is:

1. A 3Dimension stereoscopic display device mounted in or held by a moving object, said 3Dimension stereoscopic display device comprising:
   a moving object state detector to detect a state of said moving object;
   a screen composition processor to generate a right-eye image or right-eye video image, and a left-eye image or left-eye video image for planar display or for three-dimensional stereoscopic display of an image or video image which is a display object;
   a playback processor to playback the images or video images generated by said screen composition processor; and
   a stereoscopic display monitor to receive said images or video images played back by said playback processor which are the display object, and displaying said images or video images in a three-dimensional stereoscopic manner,
   wherein said screen composition processor switches between outputting said right-eye image or right-eye video image, and said left-eye image or left-eye video image for planar display to said playback processor and outputting said right-eye image or right-eye video image, and said left-eye image or left-eye video image for three-dimensional stereoscopic display to said playback processor according to the state of said moving object which is detected by said moving object state detector,
   wherein when said moving object state detector detects that said moving object is moving, said screen composition processor generates the right-eye image or right-eye video image, and the left-eye image or left-eye video image for planar display of said image or video image which is the display object, whereas when said moving object state detector detects that said moving object is at rest, said screen composition processor generates the right-eye image or right-eye video image, and the left-eye image or left-eye video image for three-dimensional stereoscopic display of said image or video image which is the display object.

2. The 3Dimension stereoscopic display device according to claim 1, wherein said image or video image which is the display object includes at least one of a map image or video image, an image in which character information is described, and an icon image.

3. The 3Dimension stereoscopic display device according to claim 2, wherein when generating a right-eye image and a left-eye image for three-dimensional stereoscopic display of a plurality of icon images, said screen composition processor places all virtual display surfaces on which said plurality of icon images are respectively displayed in a three-dimensional stereoscopic manner at an identical position.

4. The 3Dimension stereoscopic display device according to claim 2, wherein in a case in which an operation performed on an icon image can cause a function associated with the icon image to be performed, said screen composition processor generates a right-eye image and a left-eye image for three-dimensional stereoscopic display of only an icon image associated with a function which is permitted to be performed when said moving object is moving.

5. The 3Dimension stereoscopic display device according to claim 1, wherein as the right-eye image or right-eye video image, and the left-eye image or left-eye video image for planar display of said image or video image which is the display object, said screen composition processor generates a right-eye image or right-eye video image, and a left-eye image or left-eye video image which are same as each other.

6. The 3Dimension stereoscopic display device according to claim 1, wherein said moving object state detector detects a state of a surrounding environment of said moving object, and said screen composition processor switches between outputting said right-eye image or right-eye video image, and said left-eye image or left-eye video image for planar display to said playback processor and outputting said right-eye image or right-eye video image, and said left-eye image or left-eye video image for three-dimensional stereoscopic display to said playback processor according to the state of the surrounding environment of said moving object which is detected by said moving object statedetector.

7. A 3Dimension stereoscopic display device mounted in or held by a moving object, said 3Dimension stereoscopic display device comprising:
  a moving object state detector to detect a state of said moving object;
  a screen composition processor to generate a right-eye image or right-eye video image, and a left-eye image or left-eye video image for planar display, or for three-dimensional stereoscopic display of an image or video image which is a display object;
  a playback processor to playback the images or video images generated by said screen composition processor; and
  a stereoscopic display monitor to receive said images or video images played back by said playback processor which are the display object, and displaying said images or video images in a three-dimensional stereoscopic manner,
  wherein said screen composition processor switches between outputting said right-eye image or right-eye video image, and said left-eye image or left-eye video image for planar display to said playback processor and outputting said right-eye image or right-eye video image, and said left-eye image or left-eye video image for three-dimensional stereoscopic display to said playback processor according to the state of said moving object which is detected by said moving object state detector,
  wherein said 3Dimension stereoscopic display device includes a back camera unit mounted in said moving object, for capturing an image of an object to be captured in a back of said moving object to acquire a 3Dimension stereoscopic image of the object to be captured, and wherein said screen composition processor outputs said 3Dimension stereoscopic image acquired by said back camera unit to said playback processor when said moving object state detector detects that said moving object is reversing, and said stereoscopic display monitor receives said 3Dimension stereoscopic image played back by said playback processor, and displays said 3Dimension stereoscopic image in a three-dimensional stereoscopic manner.

8. The 3Dimension stereoscopic display device according to claim 7, wherein said screen composition processor superimposes, as a three-dimensional stereoscopic line, a guideline showing a direction of the movement of said moving object reversing on said 3Dimension stereoscopic image acquired by said back camera unit, and said stereoscopic display monitor receives said 3Dimension stereoscopic image which is played back by said playback processor and on which said guideline is superimposed, and displays said 3Dimension stereoscopic image in a three-dimensional stereoscopic manner.

9. A 3Dimension stereoscopic display device mounted in or held by a moving object, said 3Dimension stereoscopic display device comprising:
  a moving object state detector to detect a state of said moving object;
  a screen composition processor to generate a right-eye image or right-eye video image, and a left-eye image or left-eye video image for planar display, or for three-dimensional stereoscopic display of an image or video image which is a display object;
  a playback processor to playback the images or video images generated by said screen composition processor; and
  a stereoscopic display monitor to receive said images or video images played back by said playback processor which are the display object, and displaying said images or video images in a three-dimensional stereoscopic manner,
  wherein said screen composition processor changes a position of a virtual display surface for three-dimensional stereoscopic display of an operation icon image which is a display object according to the state of said moving object which is detected by said moving object state detector to generates a right-eye operation icon image and a left-eye operation icon image in which a virtual height of the operation icon image is changed.

10. The 3Dimension stereoscopic display device according to claim 9, wherein said screen composition processor changes the position of the virtual display surface for three-dimensional stereoscopic display of said operation icon image which is the display object according to a speed of said moving object which is detected by said moving object state detector to generate the right-eye operation icon image and the left-eye operation icon image in which the virtual height of the operation icon image is changed.

11. The 3Dimension stereoscopic display device according to claim 9, wherein said image or video image which is the display object includes at least one of a map image or video image, an image in which character information is described, and an operation icon image.

12. The 3Dimension stereoscopic display device according to claim 11, wherein when generating a right-eye image and a left-eye image for three-dimensional stereoscopic display of a plurality of operation icon images, said screen composition processor places all virtual display surfaces on which said plurality of operation icon images are respectively displayed in a three-dimensional stereoscopic manner at an identical position to make virtual heights of said plurality of operation icon images be equal to one another.

13. The 3Dimension stereoscopic display device according to claim 11, wherein said screen composition processor generates a right-eye image and a left-eye image for three-dimensional stereoscopic display of only an icon image associated with a function which is permitted to be performed when said moving object is moving.

14. The 3Dimension stereoscopic display device according to claim 9, wherein as the right-eye image or right-eye video image, and the left-eye image or left-eye video image for planar display of said image or video image which is the display object, said screen composition processor generates a right-eye image or right-eye video image and a left-eye image or left-eye video image which are same as each other.

15. The 3Dimension stereoscopic display device according to claim 9, wherein said 3Dimension stereoscopic display device includes a back camera unit mounted in said moving object, for capturing an object to be captured in a back of said moving object to acquire a 3Dimension stereoscopic image of the object to be captured, and wherein said screen composition processor outputs said 3Dimension stereoscopic image acquired by said back camera unit to said playback processor when said moving object state detector detects that said moving object is reversing, and said stereoscopic display monitor receives said 3Dimension stereoscopic image played by said playback processor, and displays said 3Dimension stereoscopic image in a three-dimensional stereoscopic manner.

16. The 3Dimension stereoscopic display device according to claim 15, wherein when said moving object state detector detects that said moving object is reversing, said screen composition processing unit superimposes, as a three-dimensional stereoscopic line, a guideline showing a direction of the movement of said moving object reversing on said 3Dimension stereoscopic image acquired by said back camera unit, and said stereoscopic display monitor unit receives said 3Dimension stereoscopic image which is played back by said playback processor and on which said guideline is superimposed, and displays said 3Dimension stereoscopic image in a three-dimensional stereoscopic manner.

17. The 3Dimension stereoscopic display device according to claim 9, wherein said moving object state detector detects a state of a surrounding environment of said moving object, and said screen composition processing unit generates the right-eye image or right-eye video image, and the left-eye image or left-eye video image for three-dimensional stereoscopic display in which the position of the virtual display surface for three-dimensional stereoscopic display of said image or video image which is the display object is changed according to the state of the surrounding environment of said moving object which is detected by said moving object state detector.

18. A 3Dimension stereoscopic display device mounted in or held by a moving object, said 3Dimension stereoscopic display device comprising:
   a moving object state detector to detect a state of said moving object;
   a screen composition processor which consists of an LSI circuit, to generate a right-eye image or right-eye video image, and a left-eye image or left-eye video image for planar display or for three-dimensional stereoscopic display of an image or video image which is a display object;
   a playback processor to playback the images or video images generated by said screen composition processor; and
   a stereoscopic display monitor to receive said images or video images played back by said playback processor which are the display object, and displaying said images or video images in a three-dimensional stereoscopic manner,
   wherein said screen composition processor changes a position of a virtual display surface for three-dimensional stereoscopic display of an operation icon image which is a display object according to the state of said moving object which is detected by said moving object state detector to generate a right-eye operation icon image and a left-eye operation icon image for three-dimensional stereoscopic display in which a virtual height of the operation icon image is changed.

19. An LSI circuit disposed in a 3Dimension stereoscopic display device mounted in or held by a moving object and including a moving object state detector to detect a state of moving object, a screen composition processor to generate a right-eye image or right-eye video image, and a left-eye image or left-eye video image for planar display or for three-dimensional stereoscopic display of an image or video image which is a display object, a playback processor for playing back the images or video images generated by said screen composition processor, and a stereoscopic display monitor to receive said images or video images played back by said playback processor which are the display object, and displaying said images or video images in a three-dimensional stereoscopic manner, wherein
   said LSI circuit functions as said screen composition processor which changes a position of a virtual display surface for three-dimensional stereoscopic display of an operation icon image which is a display object according to the state of said moving object which is detected by said moving object state detector to generate a right-eye operation icon image and a left-eye operation icon image for three-dimensional stereoscopic display in which a virtual height of the operation icon image is changed.

20. An LSI circuit disposed in a 3Dimension stereoscopic display device mounted in or held by a moving object and including a moving object state detector to detect a state of moving object, a playback processor to playback images or video images generated by a screen composition processor shown below, and a stereoscopic display monitor to receive said images or video images played back by said playback processor which are a display object, and displaying said images or video images in a three-dimensional stereoscopic manner, wherein
   said LSI circuit functions as said screen composition processor which generates a right-eye image or right-eye video image, and a left-eye image or left-eye video image for planar display or for three-dimensional stereoscopic display of an image or video image which is a display object, and which changes a position of a virtual display surface for three-dimensional stereoscopic display of an operation icon image which is a display object according to the state of said moving object which is detected by said moving object state detector to generate a right-eye operation icon image and a left-eye operation icon image for three-dimensional stereoscopic display in which a virtual height of the operation icon image is changed.

* * * * *